United States Patent
Sakano

(10) Patent No.: US 11,897,989 B2
(45) Date of Patent: Feb. 13, 2024

(54) FLUORINE-CONTAINING CURABLE COMPOSITION AND ARTICLE

(71) Applicant: SHIN-ETSU CHEMICAL CO., LTD., Tokyo (JP)

(72) Inventor: Yasunori Sakano, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 118 days.

(21) Appl. No.: 17/618,171

(22) PCT Filed: May 26, 2020

(86) PCT No.: PCT/JP2020/020718
§ 371 (c)(1),
(2) Date: Dec. 10, 2021

(87) PCT Pub. No.: WO2020/250665
PCT Pub. Date: Dec. 17, 2020

(65) Prior Publication Data
US 2022/0220262 A1 Jul. 14, 2022

(30) Foreign Application Priority Data
Jun. 11, 2019 (JP) ................... 2019-108326

(51) Int. Cl.
| | |
|---|---|
| C08F 290/06 | (2006.01) |
| C08G 77/385 | (2006.01) |
| C08F 230/08 | (2006.01) |
| C08G 65/336 | (2006.01) |
| C08F 259/08 | (2006.01) |
| C08F 283/06 | (2006.01) |

(52) U.S. Cl.
CPC .......... *C08F 290/06* (2013.01); *C08F 230/08* (2013.01); *C08F 259/08* (2013.01); *C08F 283/06* (2013.01); *C08F 290/062* (2013.01); *C08G 65/336* (2013.01); *C08G 77/385* (2013.01)

(58) Field of Classification Search
CPC ............ C08L 2205/02; C08L 2205/025; C08F 290/068; C09D 4/00
See application file for complete search history.

(56) References Cited

U.S. PATENT DOCUMENTS

| | | | | |
|---|---|---|---|---|
| 2006/0148350 A1* | 7/2006 | Chang | ................... | C09D 133/14 442/148 |
| 2010/0024685 A1 | 2/2010 | Sakano et al. | | |
| 2010/0147191 A1 | 6/2010 | Sakano et al. | | |
| 2010/0317875 A1 | 12/2010 | Sakano et al. | | |
| 2021/0269666 A1* | 9/2021 | Ota | ..................... | C08F 290/068 |
| 2022/0389142 A1* | 12/2022 | Mori | ................... | C09D 201/04 |

FOREIGN PATENT DOCUMENTS

| | | |
|---|---|---|
| JP | 6-211945 A | 8/1994 |
| JP | 2010-53114 A | 3/2010 |
| JP | 2010-138112 A | 6/2010 |
| JP | 2010-285501 A | 12/2010 |
| JP | 2013-216732 A | 10/2013 |
| JP | 2017-2216 A | 1/2017 |
| JP | 2017-8128 A | 1/2017 |
| JP | 2017-190429 A | 10/2017 |
| WO | WO 2019/142567 A1 | 7/2019 |

OTHER PUBLICATIONS

International Search Report for PCT/JP2020/020718 dated Jul. 21, 2020.
Written Opinion of the International Searching Authority for PCT/JP2020/020718 (PCT/ISA/237) dated Jul. 21, 2020.

* cited by examiner

*Primary Examiner* — Marc S Zimmer
(74) *Attorney, Agent, or Firm* — Birch, Stewart, Kolasch & Birch, LLP

(57) ABSTRACT

A fluorine-containing curable composition which contains, as essential components, component (A) that is composed of a compound which is a linear polymer having a fluoropolyether in the main chain, while having a trifluoromethyl group at one end of the molecular chain and two or more (meth)acryl groups at the other end, component (B) that is composed of a compound which is a linear polymer having a fluoropolyether in the main chain, while having two or more (meth)acryl groups at each end of the molecular chain, and which has four to ten (meth)acryl groups in each molecule on average, and component (C) that is composed of a non-fluorinated acrylic compound which contains no fluoropolyether structure, while having two or more (meth)acryl groups in each molecule on average; the total blending amount of component (A) and component (B) relative to 100 parts by mass of component (C) is from 0.05 to 50 parts by mass; and the blending amount of component (A) relative to 100 parts by mass of component (B) is 1 to 100 parts by mass. This fluorine-containing curable composition is capable of forming a cured film that exhibits excellent antifouling properties and excellent water repellency, while having a low coefficient of kinetic friction.

12 Claims, No Drawings

FLUORINE-CONTAINING CURABLE COMPOSITION AND ARTICLE

TECHNICAL FIELD

This invention relates to a curable fluorinated composition capable of forming a cured film having excellent antifouling and slipping properties, and an article having a cured film of the composition on its surface.

BACKGROUND ART

In the prior art, hard coat treatment is generally used as the means for protecting surfaces of resin moldings or the like. This treatment is by forming a hard cured resin layer (hard coat layer) on the surface of a molding for rendering the surface less vulnerable to flaws. As the material of which the hard coat layer is made, thermosetting resins and actinic energy ray-curable compositions such as UV or EB-curable resins are often used.

On the other hand, the demand for endowing cured resin layers (hard coat layers) with higher functionality is increasing in proportion to the enlargement of utilization fields of resin moldings and the trend toward higher added values. One exemplary demand is to endow the hard coat layer with antifouling properties. Once the surface of a hard coat layer is endowed with water or oil-repellent properties, the surface becomes antifouling or if fouled, any deposits can be readily removed from the surface.

Among the methods for endowing a hard coat layer with antifouling properties, the method of once forming a hard coat layer and coating and/or fixing a fluorinated antifouling agent to its surface is widely used. A study is also made on the method of adding a curable fluorinated component to a curable resin composition prior to curing, coating and curing the composition for thereby achieving formation of a hard coat layer and impartment of antifouling properties at the same time. For example, Patent Document 1: JP-A H06-211945 discloses that a hard coat layer endowed with antifouling properties is prepared by adding a fluoroalkyl acrylate to a curable acrylic resin composition and curing the composition.

Recently, actinic energy ray-curable compositions having such fluorinated acrylic compounds blended and exhibiting excellent antifouling properties find greatly expanding applications. A novel function is accordingly required.

While the hard coats find the greatly expanding range of applications, especially for the antifouling surface treatment of large-size displays and the surface treatment of displays and casings of portable information instruments such as smartphones and tablets, there is a need for higher performance in terms of antifouling properties as typified by water repellency and abrasion resistance as typified by slipping properties. One of the means for meeting these demands is to cause a highly fluorine-modified component to segregate on the surface. However, when the fluorine content is increased using a fluorinated acrylic compound of single structure, the solubility in other components of the non-fluorinated hard coat agent lowers. As a result, local coating faults due to non-uniform portions such as deficits or overall coating faults such as orange-peel develop on the coating surface.

Prior art references pertinent to the present invention include the above-cited document and the following documents.

PRIOR ART DOCUMENTS

Patent Documents

Patent Document 1: JP-A H06-211945
Patent Document 2: JP-A 2010-053114
Patent Document 3: JP-A 2010-138112
Patent Document 4: JP-A 2010-285501

SUMMARY OF INVENTION

Technical Problem

An object of the invention, which has been made under the above-mentioned circumstances, is to provide a curable fluorinated composition having stable solubility and exhibiting high antifouling and slipping properties after curing, and an article having a cured film of the composition on its surface.

Solution to Problem

Seeking for a fluorinated compound capable of endowing a curable resin composition with antifouling properties, the inventor made a series of development works including the photo-curable fluorinated compounds as described in Patent Document 2 (JP-A 2010-053114), Patent Document 3 (JP-A 2010-138112), and Patent Document 4 (JP-A 2010-285501). For the purpose of improving antifouling and slipping properties, it is believed effective to increase the fluorine content of compounds. However, when the solubility in non-fluorinated components is increased using a fluorinated acrylic compound of single structure as mentioned above, it becomes unlikely for fluorine components to concentrate on the coating surface. As a result, the development of antifouling performance is minimized.

Continuing further efforts, the inventor has found that a curable fluorinated composition comprising as essential components, component (A) which is a compound in the form of a linear polymer having a fluoropolyether backbone, having a trifluoromethyl group at one end of the molecule and at least two (meth)acryloyl groups at the other end of the molecule, component (B) which is a compound in the form of a linear polymer having a fluoropolyether backbone, having at least two (meth)acryloyl groups at each end of the molecule, and having on the average 4 to 10 (meth)acryloyl groups per molecule, and component (C) in the form of a non-fluorinated acrylic compound free of fluoropolyether structure and having on the average at least two (meth)acryloyl groups per molecule, wherein the total amount of components (A) and (B) blended is 0.05 to 50 parts by weight per 100 parts by weight of component (C), and the amount of component (A) blended is 1 to 100 parts by weight per 100 parts by weight of component (B) forms a cured film exhibiting improved antifouling and water repellent properties and having a low coefficient of dynamic friction. The invention is predicated on this finding.

Accordingly, the invention provides a curable fluorinated composition and an article having a cured film of the composition on its surface, as defined below.

[1]
A curable fluorinated composition comprising as essential components,
component (A) which is a compound in the form of a linear polymer having a fluoropolyether backbone, having a trifluoromethyl group at one end of the molecule and at least two (meth)acryloyl groups at the other end of the molecule, component (B) which is a compound in the form of a linear polymer having a fluoropolyether backbone, having at least two (meth)acryloyl groups at each end of the molecule, and having on the average 4 to 10 (meth)acryloyl groups per molecule, and component (C) which is a non-fluorinated acrylic compound free of fluoropolyether structure and having on the average at least two (meth)acryloyl groups per molecule, wherein the total amount of components (A) and (B) blended is 0.05 to 50 parts by weight per 100 parts by weight of component (C), and the amount of component (A) blended is 1 to 100 parts by weight per 100 parts by weight of component (B).

[2]

The curable fluorinated composition of [1], further comprising (D) a photopolymerization initiator.

[3]

The curable fluorinated composition of [1] or [2] wherein component (A) is a fluorinated acrylic compound having the general formula (1):

$$Rf^4-Z^1-Q^1[X^1]_a \quad (1)$$

wherein $Rf^4$ is a monovalent perfluoropolyether group having a trifluoromethyl group at the opposite end to the end of attachment to $Z^1$; $Z^1$ is a linking group in the form of a $C_{1-20}$ divalent hydrocarbon group which may contain at least one heteroatom selected from oxygen, nitrogen, and silicon, which may contain a cyclic structure therein, and in which some carbon-bonded hydrogen may be substituted by fluorine; $Q^1$ is a (a+1)-valent linking group containing at least (a+1) number of silicon atoms, which may take a cyclic structure; "a" is an integer of 2 to 5; and $X^1$ is independently a monovalent organic group having a (meth)acryloyl group which may contain at least one heteroatom selected from oxygen, nitrogen, and silicon.

[4]

The curable fluorinated composition of any one of [1] to [3] wherein component (B) is a fluorinated acrylic compound having the general formula (2):

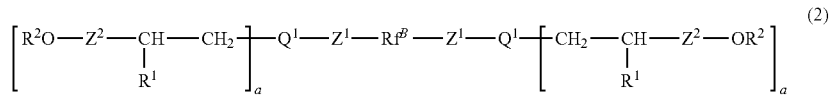

wherein $Rf^B$ is a divalent perfluoropolyether group; $Z^1$ is independently a linking group in the form of a $C_{1-20}$ divalent hydrocarbon group which may contain at least one heteroatom selected from oxygen, nitrogen, and silicon, which may contain a cyclic structure therein, and in which some carbon-bonded hydrogen may be substituted by fluorine; $Q^1$ is independently a (a+1)-valent linking group containing at least (a+1) number of silicon atoms, which may take a cyclic structure; "a" is an integer of 2 to 5; $Z^2$ is each independently a $C_{1-100}$ divalent hydrocarbon group which may contain oxygen and/or nitrogen, and which may contain a cyclic structure therein; $R^1$ is independently hydrogen or a $C_{1-8}$ monovalent hydrocarbon group; $R^2$ is independently hydrogen or a monovalent organic group having a (meth)acryloyl group, which may contain oxygen and/or nitrogen; with the proviso that there are contained at least two monovalent organic groups $R^2$ at each end of the molecule and on the average 4 to 10 monovalent organic groups $R^2$ per molecule.

[5]

The curable fluorinated composition of [3] or [4] wherein in formula (1) representative of component (A), $X^1$ is selected from the following.

—$CH_2CH_2CH_2OC(=O)NHCH_2CH_2OC(=O)CH=CH_2$
—$CH_2CH_2CH_2OCH_2CH_2OC(=O)NHCH_2CH_2OC(=O)CH=CH_2$
—$CH_2CH_2CH_2OC(=O)NHCH_2CH_2OC(=O)C(CH_3)=CH_2$
—$CH_2CH_2CH_2OCH_2CH_2OC(=O)NHCH_2CH_2OC(=O)C(CH_3)=CH_2$
—$CH_2CH_2CH_2OC(=O)NHC(CH_3)[CH_2OC(=O)CH=CH_2]_2$
—$CH_2CH_2CH_2OCH_2CH_2OC(=O)NHC(CH_3)[CH_2OC(=O)CH=CH_2]_2$
—$CH_2CH_2CH_2OC(=O)CH=CH_2$
—$CH_2CH_2CH_2OCH_2CH_2OC(=O)CH=CH_2$
—$CH_2CH_2CH_2OC(=O)C(CH_3)=CH_2$
—$CH_2CH_2CH_2OCH_2CH_2OC(=O)C(CH_3)=CH_2$
—$CH_2CH_2Si[OSi(CH_3)_2CH_2OC(=O)CH=CH_2]_3$
—$CH_2CH_2Si[OSi(CH_3)_2CH_2OC(=O)C(CH_3)=CH_2]_3$

[Chem. 2]

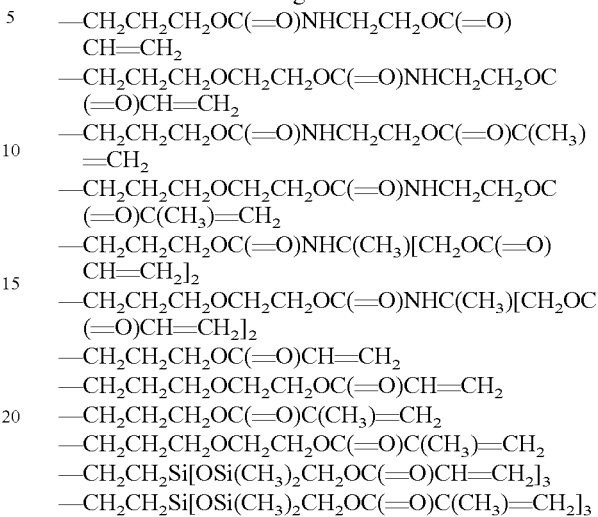

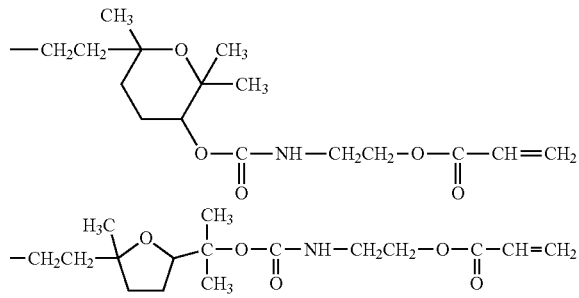

-continued

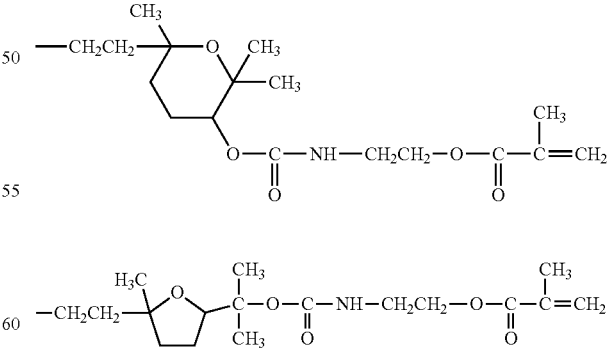

[6]

The curable fluorinated composition of any one of [3] to [5] wherein in formula (1) representative of component (A), $Q^1$ is selected from the following:

[Chem. 3]
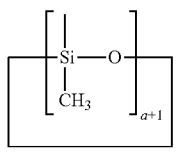
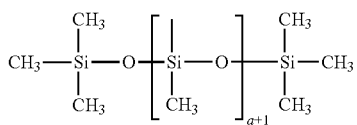
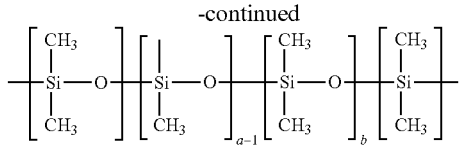
wherein "a" is an integer of 2 to 5, and b is an integer of 1 to 5.
[7]
The curable fluorinated composition of any one of [3] to [6] wherein the fluorinated acrylic compound having formula (1) representative of component (A) is selected from compounds having the following formulae:
[Chem. 4]
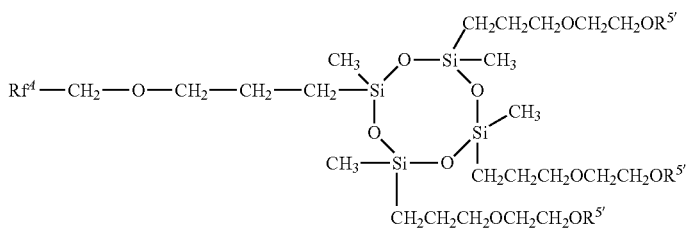
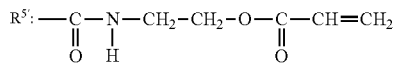
[Chem. 5]
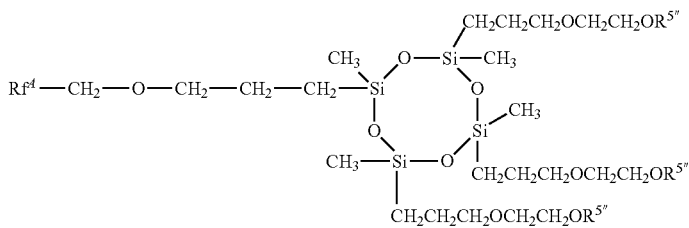
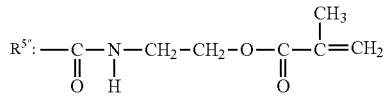
[Chem. 6]
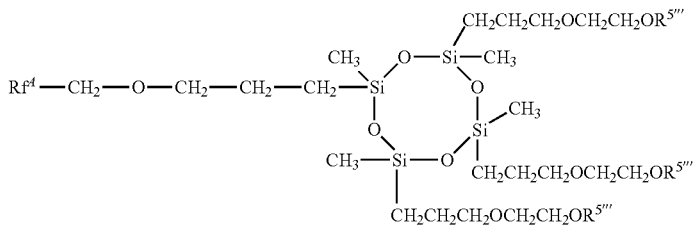
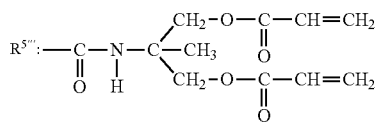

[Chem. 7]
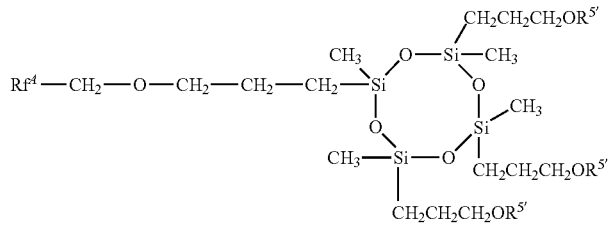
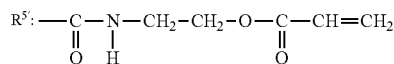
[Chem. 8]
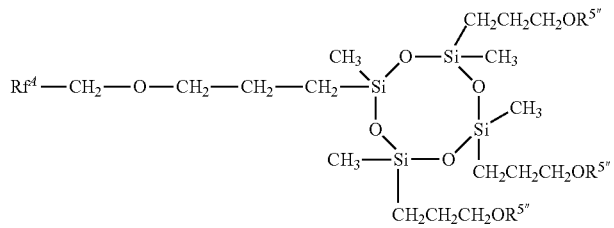
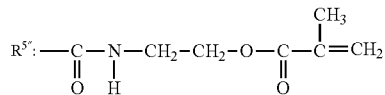
[Chem. 9]
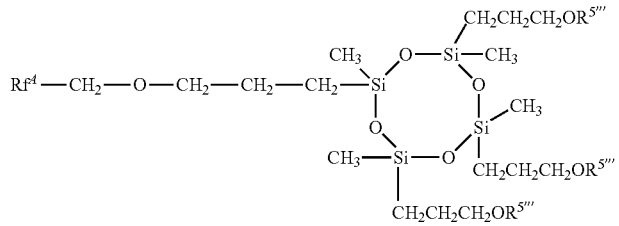
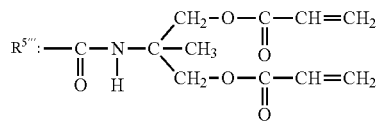
[Chem. 10]
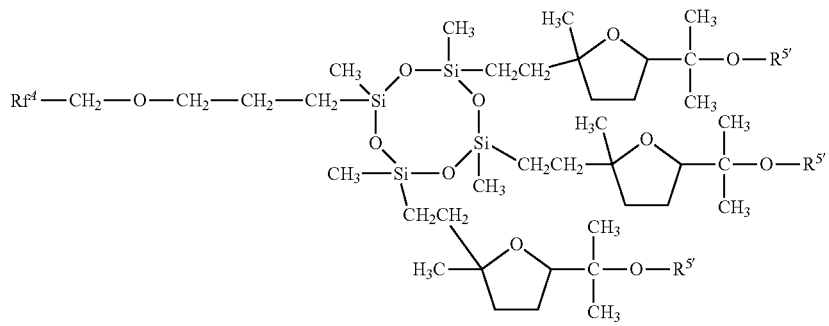
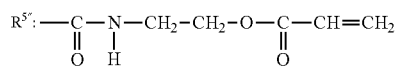

-continued

[Chem. 11]

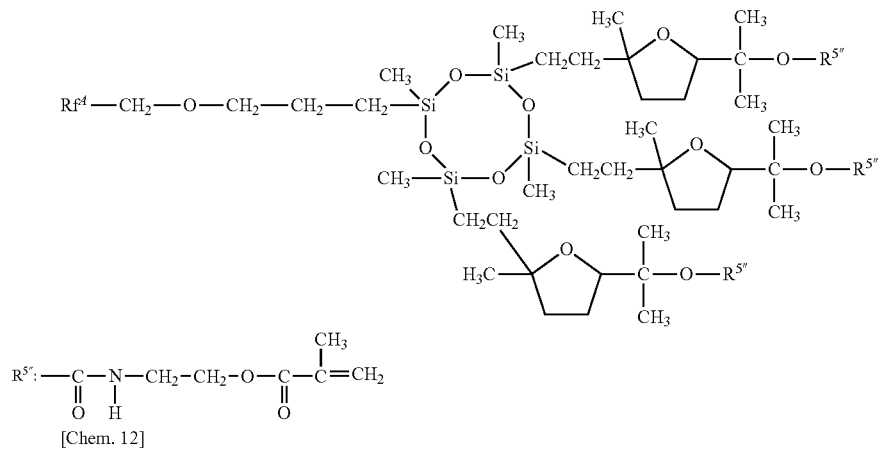

[Chem. 12]

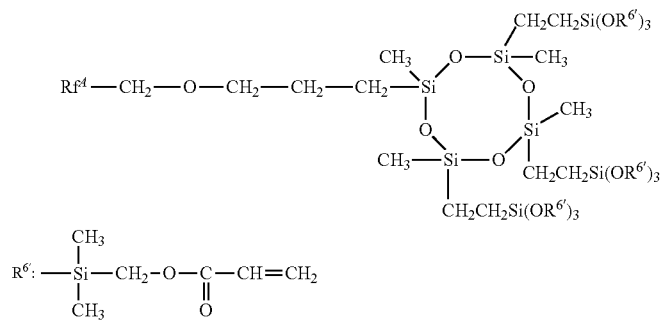

[Chem. 13]

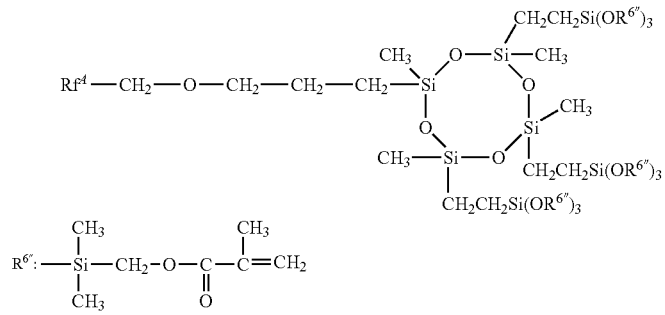

wherein Rf⁴ is as defined above.

[8]

The curable fluorinated composition of any one of [4] to [7] wherein $Z^1$ in formula (2) representative of component (B) is selected from the following.

—CH$_2$CH$_2$—
—CH$_2$CH$_2$CH$_2$—
—CH$_2$CH$_2$CH$_2$CH$_2$—
—CH$_2$OCH$_2$CH$_2$—
—CH$_2$OCH$_2$CH$_2$CH$_2$—

[9]

The curable fluorinated composition of any one of [4] to [8] wherein $Q^1$ in formula (2) representative of component c) is a group having the following formula:

[Chem. 14]

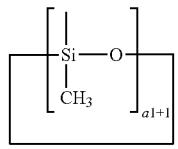

wherein a1 is 2 or 3.

[10]

The curable fluorinated composition of any one of [4] to [9] wherein the fluorinated acrylic compound having formula (2) representative of component (B) is a fluorinated acrylic compound having the general formula (3) or (4):

[Chem. 15]

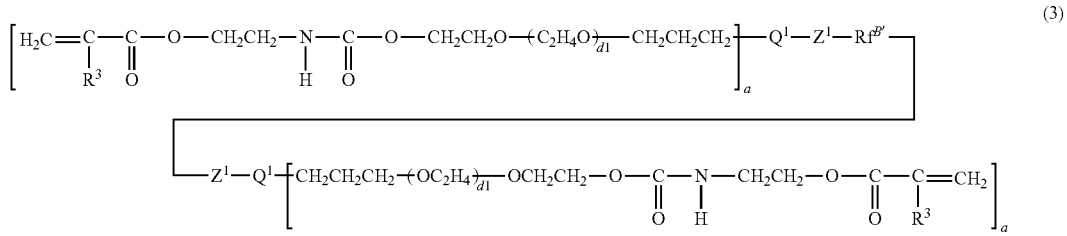

(3)

[Chem. 16]

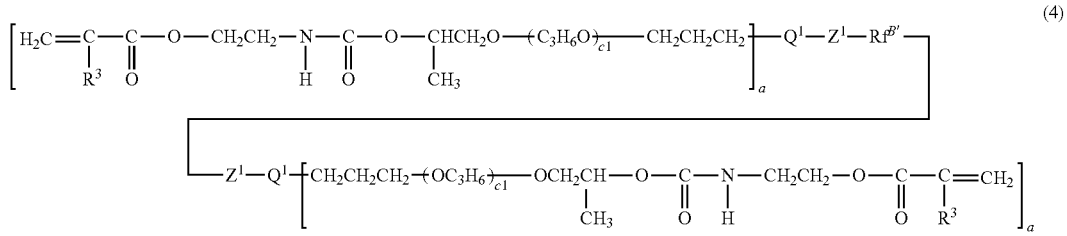

(4)

wherein $Z^1$, $Q^1$, and "a" are as defined above, $Rf^{B'}$ is $-CF_2O(CF_2O)_m(CF_2CF_2O)_nCF_2-$, m is an integer of 1 to 200, n is an integer of 1 to 170, m+n is an integer of 6 to 201, the arrangement of $-(CF_2O)-$ and $-(CF_2CF_2O)-$ is random, $R^3$ is hydrogen or methyl, d1 and e1 each are an integer of 0 to 10.

[11]

The curable fluorinated composition of any one of [1] to [10] wherein the non-fluorinated acrylic compound as component (C) is a polyfunctional acrylic compound containing at least two (meth)acryloyl groups per molecule, but free of a urethane bond, a polyfunctional urethane (meth)acrylate having at least three (meth)acryloyl groups per molecule which is obtained by reacting said polyfunctional acrylic compound with an aliphatic polyisocyanate and a hydroxy-containing acrylic compound, or a mixture of at least two acrylic compounds including said polyfunctional acrylic compound and said polyfunctional urethane (meth)acrylate.

[12]

An article having a cured film of the curable fluorinated composition of any one of [1] to [11] on its surface.

Advantageous Effects of Invention

The curable fluorinated composition of the invention maintains stable solubility during coating and forms a cured surface having improved antifouling, stain wipe-off, and slipping properties.

DESCRIPTION OF EMBODIMENTS

The invention provides a curable fluorinated composition comprising component (A) which is a compound in the form of a linear polymer having a fluoropolyether backbone, having a trifluoromethyl group at one end of the molecule and at least two (meth)acryloyl groups at the other end of the molecule, component (B) which is a compound in the form of a linear polymer having a fluoropolyether backbone, having at least two (meth)acryloyl groups at each end of the molecule, and having on the average 4 to 10 (meth)acryloyl groups per molecule, and component (C) in the form of a non-fluorinated acrylic compound free of fluoropolyether structure and having on the average at least two (meth) acryloyl groups per molecule. The foregoing components (A), (B), and (C) are essential.

As employed herein, the term "acrylic compound" collectively means compounds having an acryloyl or methacryloyl group; "(meth)acryloyl group" refers to one or both of acryloyl and methacryloyl groups; "(meth)acrylic acid" refers to one or both of acrylic and methacrylic acids; "(meth)acrylate" refers to one or both of acrylate and methacrylate.

It is noted that each of components (A), (B) and (C) need not be a single compound. For example, when the weight of a component blended is considered, the total of amounts of plural compounds meeting the conditions of each of components (A), (B) and (C) may be considered as the weight of that component.

[Component (A)]

Component (A), which is a first essential component in the curable fluorinated composition of the invention, is a compound in the form of a linear polymer having a fluoropolyether backbone, having a trifluoromethyl group at one end of the molecule and at least two, preferably 2 to 15, more preferably 2 to 9 (meth)acryloyl groups at the other end of the molecule (i.e., one end of the molecular chain).

Typical of the compound is a fluorinated acrylic compound having the general formula (1).

In formula (1), $Rf^4$ is a monovalent perfluoropolyether group having a trifluoromethyl group at the opposite end to the end of attachment to $Z^1$, which is represented by $Rf^1-O-Rf^2-CF_2-$.

Herein $Rf^1$ is a $C_{1-10}$ perfluoroalkyl group having a trifluoromethyl group at the opposite end to the end of attachment to the oxygen atom, which may contain oxygen, preferably a group of the formula: $CF_3-Z^f-$ wherein $Z^f$ is a single bond or a $C_{1-10}$ perfluoroalkylene group which may contain oxygen. Examples of $Rf^1$ are shown below.

$CF_3-$
$CF_3CF_2-$
$CF_3CF_2-$
$CF_3CF_2CF_2-$
$CF_3CF_2CF_2CF_2-$

CF$_3$CF$_2$CF$_2$CF$_2$CF$_2$—
CF$_3$CF$_2$CF$_2$CF$_2$CF$_2$CF$_2$—
CF$_3$OCF$_2$CF$_2$CF$_2$—
CF$_3$CF$_2$OCF$_2$CF$_2$CF$_2$—
CF$_3$OCF$_2$CF$_2$CF$_2$—
CF$_3$OCF$_2$CF$_2$CF$_2$CF$_2$—
CF$_3$OCF(CF$_3$)CF$_2$—
CF$_3$CF$_2$CF$_2$OCF(CF$_3$)CF$_2$—
(CF$_3$)$_2$CFOCF$_2$CF$_2$—
CF$_3$CF$_2$OCF$_2$CF$_2$CF$_2$—
CF$_3$CF$_2$CF$_2$OCF$_2$CF$_2$CF$_2$—
CF$_3$CF$_2$CF$_2$OCF$_2$CF$_2$CF$_2$CF$_2$—
(CF$_3$)$_2$CFCF$_2$OCF$_2$CF$_2$—
CF$_3$CF$_2$CF$_2$CF$_2$OCF$_2$CF$_2$CF$_2$—

Inter alia, CF$_3$— is most preferred.

Rf$^2$ is a divalent perfluoropolyether group consisting of randomly arranged repeat units of one or more types selected from the following four types:
—CF$_2$O—,
—CF$_2$CF$_2$O—,
—CF$_2$CF$_2$CF$_2$O—, and
—CF$_2$CF$_2$CF$_2$CF$_2$O—,
the group having a molecular weight of 600 to 20,000, preferably 1,200 to 10,000. The molecular weight is a number average molecular weight as computed from a ratio of terminal structure to backbone structure based on $^1$H-NMR and $^{19}$F-NMR spectroscopy. Rf$^2$ is preferably, for example, a group of the following formula:

—(CF$_2$O)$_m$(CF$_2$CF$_2$O)$_n$— wherein the hyphen (-) on the left is a point of attachment to 0 and the hyphen (-) on the right is a point of attachment to CF$_2$.

The arrangement of repeat units is random, m is an integer of 1 to 200, preferably 6 to 50, n is an integer of 1 to 170, preferably 6 to 50, and m+n is an integer of 6 to 201, preferably 12 to 100. If the values of m, n and m+n are smaller than the ranges, the effect of endowing a cured film with antifouling properties is reduced. If the values of m, n and m+n are larger than the ranges, the compatibility with non-fluorinated components is aggravated, causing turbidity to the coating fluid or coating defects. The values of m and n may have a distribution and in case of having a distribution, it is preferred that the value of m+n as computed from $^{19}$F-NMR or similar spectroscopy meet, on the number average, the above range.

In formula (1), Z$^1$ is a linking group in the form of a C$_{1-20}$ divalent hydrocarbon group which may contain at least one heteroatom selected from oxygen, nitrogen, and silicon, which may contain a cyclic structure halfway, and in which some carbon-bonded hydrogen may be substituted by fluorine. Z$^1$ is preferably a structure selected from the group of the following structures. Notably, the hyphen on the left is a point of attachment to Rf$^4$ and the hyphen on the right is a point of attachment to Q$^1$.
—CH$_2$CH$_2$—
—CH$_2$CH$_2$CH$_2$—
—CH$_2$CH$_2$CH$_2$CH$_2$—
—CH$_2$OCH$_2$CH$_2$—
—CH$_2$OCH$_2$CH$_2$CH$_2$—

[Chem. 17]

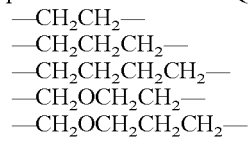

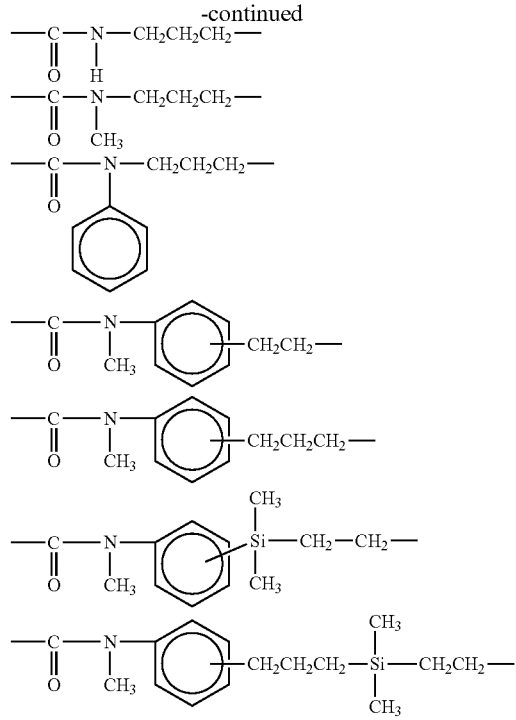

Inter alia, the following are preferred.
—CH$_2$CH$_2$—
—CH$_2$CH$_2$CH$_2$—
—CH$_2$CH$_2$CH$_2$CH$_2$—
—CH$_2$OCH$_2$CH$_2$—
—CH$_2$OCH$_2$CH$_2$CH$_2$—

[Chem. 18]

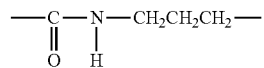

In formula (1), "a" is independently an integer of 2 to 5, preferably 2 to 4, more preferably 2 or 3. If "a" is less than 2, the solubility in component (C) is reduced, sometimes incurring non-uniformity to the coating fluid or coating defects. If "a" is more than 5, the compatibility with component (B) becomes so high that sometimes the superiority of surface properties as compared with the case of blending component (B) alone, but not component (A) may be lost.

In formula (1), Q$^1$ is a (a+1)-valent linking group containing at least (a+1) number of silicon atoms, which may take a cyclic structure. Preferably, Q$^1$ is a (a+1)-valent linking group in the form of a siloxane structure, an unsubstituted or halo-substituted silalkylene structure, or silarylene structure, each containing at least (a+1) number of silicon atoms, or a combination of two or more. Herein, the (a+1) number of valence bonds each preferably have (a+1) number of silicon atoms. The more preferred structures are shown below.

In the following structures, "a" is the same as "a" in formula (1), and b is an integer of 1 to 5, preferably 1 to 3. The arrangement of units is random. The valence bonds of (a+1) number of units are attached to Z$^1$ and "a" number of groups X$^1$ embraced within brackets.

[Chem. 19]

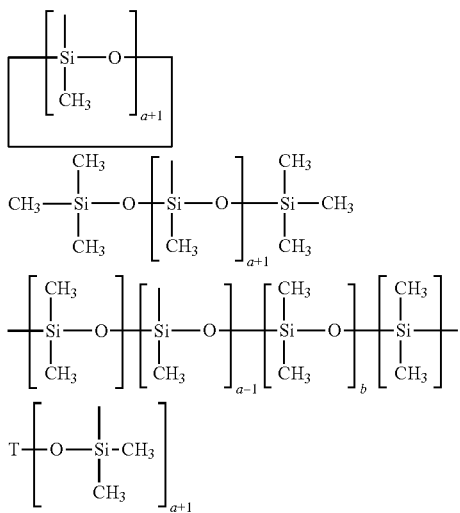

Herein, T is a (a+1)-valent linking group, examples of which are shown below.

[Chem. 20]

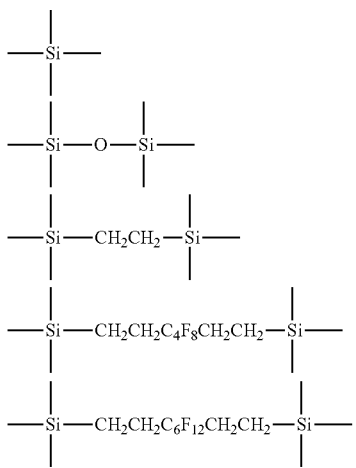

Among others, $Q^1$ is most preferably the following:

[Chem. 21]

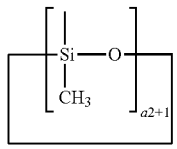

wherein a2 is an integer of 2 to 4.

In formula (1), $X^1$ is independently a monovalent organic group having a (meth)acryloyl group, preferably 1 to 3 meth)acryloyl groups, which may contain at least one heteroatom selected from oxygen, nitrogen, and silicon.

Although $X^1$ is not particularly limited as long as it is a group having a (meth)acryloyl group, which may contain at least one heteroatom selected from oxygen, nitrogen, and silicon, $X^1$ is most preferably selected from groups having the following formulae.

[Chem. 22]

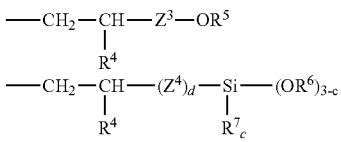

Herein $R^4$ is hydrogen or methyl; $Z^3$ is a $C_{1-20}$ divalent hydrocarbon group which may contain oxygen and/or nitrogen and which may contain a cyclic structure halfway; $R^5$ is a monovalent organic group having a (meth)acryloyl group, which may contain oxygen and/or nitrogen; $Z^4$ is a $C_{1-6}$ divalent hydrocarbon group; d is 0 or 1; $R^6$ is each independently a monovalent organic group having a diorganosilylene group and a (meth)acryloyl group; $R^7$ is a $C_{1-6}$ monovalent hydrocarbon group; and c is 0 or 1.

Specifically, $R^4$ is hydrogen or methyl, preferably hydrogen.

$Z^3$ is a $C_{1-20}$, preferably $C_{1-10}$ divalent hydrocarbon group which may contain oxygen and/or nitrogen and which may contain a cyclic structure halfway. Preferably, $Z^3$ is selected from the following structures. In the following structures, the hyphen on the left is a point of attachment to $CHR^4$ and the hyphen on the right is a point of attachment to $OR^5$.

—$CH_2$—
—$CH_2OCH_2CH_2$—

[Chem. 23]

$R^5$ is a monovalent organic group having a (meth)acryloyl group, which may contain oxygen and/or nitrogen. The monovalent organic group is preferably a group terminated with at least one, preferably one or two (meth)acryloyl groups. The group may have an amide bond, ether bond or ester bond midway the structure. Exemplary structures are shown below.

—C(=O)CH=$CH_2$
—C(=O)C($CH_3$)=$CH_2$
—C(=O)NH$CH_2CH_2$OC(=O)CH=$CH_2$
—C(=O)NH$CH_2CH_2$OC(=O)C($CH_3$)=$CH_2$
—C(=O)NH$CH_2CH_2$O$CH_2CH_2$OC(=O)C($CH_3$)=$CH_2$
—C(=O)NHC($CH_3$)[$CH_2$OC(=O)CH=$CH_2$]$_2$
—C(=O)NHC($CH_3$)[$CH_2CH_2$OC(=O)CH=$CH_2$]$_2$

Of these, the following are most preferred.

—C(=O)NH$CH_2CH_2$OC(=O)CH=$CH_2$
—C(=O)NH$CH_2CH_2$OC(=O)C($CH_3$)=$CH_2$ $Z^4$ is a $C_{1-6}$, preferably $C_{1-4}$ divalent hydrocarbon group. Examples thereof include alkylene groups such as methylene, ethylene, propylene (trimethylene or methylethylene), butylene (tetramethylene or methylpropylene) and hexamethylene, and phenylene.

The subscript d is 0 or 1, preferably 0.

$R^6$ is each independently a monovalent organic group having a diorganosilylene group (e.g., dimethylsilylene) and a (meth)acryloyl group. Examples of $R^6$ are shown below.

—Si(CH$_3$)$_2$CH$_2$OC(=O)CH=CH$_2$
—Si(CH$_3$)$_2$CH$_2$OC(=O)C(CH$_3$)=CH$_2$
—Si(CH$_3$)$_2$CH$_2$CH$_2$OC(=O)CH=CH$_2$
—Si(CH$_3$)$_2$CH$_2$CH$_2$OC(=O)C(CH$_3$)=CH$_2$
—Si(CH$_3$)$_2$CH$_2$CH$_2$CH$_2$OC(=O)CH=CH$_2$
—Si(CH$_3$)$_2$CH$_2$CH$_2$CH$_2$OC(=O)C(CH$_3$)=CH$_2$

Of these, the following are most preferred.

—Si(CH$_3$)$_2$CH$_2$OC(=O)CH=CH$_2$
—Si(CH$_3$)$_2$CH$_2$OC(=O)C(CH$_3$)=CH$_2$ $R^7$ is a $C_{1-6}$, preferably $C_{1-4}$ monovalent hydrocarbon group. Examples thereof include alkyl groups such as methyl, ethyl, propyl, isopropyl, butyl, isobutyl, tert-butyl, pentyl, neopentyl and hexyl, cycloalkyl groups such as cyclohexyl, alkenyl groups such as vinyl, allyl, and propenyl, and phenyl. $R^7$ is preferably methyl.

The subscript c is 0 or 1, preferably 0.

Preferred examples of the group $X^1$ are given by the following structures.

—CH$_2$CH$_2$CH$_2$OC(=O)NHCH$_2$CH$_2$OC(=O)CH=CH$_2$
—CH$_2$CH$_2$CH$_2$OCH$_2$CH$_2$OC(=O)NHCH$_2$CH$_2$OC(=O)CH=CH$_2$
—CH$_2$CH$_2$CH$_2$OC(=O)NHCH$_2$CH$_2$OC(=O)C(CH$_3$)=CH$_2$
—CH$_2$CH$_2$CH$_2$OCH$_2$CH$_2$OC(=O)NHCH$_2$CH$_2$OC(=O)C(CH$_3$)=CH$_2$
—CH$_2$CH$_2$CH$_2$OC(=O)NHC(CH$_3$)[CH$_2$OC(=O)CH=CH$_2$]$_2$
—CH$_2$CH$_2$CH$_2$OCH$_2$CH$_2$OC(=O)NHC(CH$_3$)[CH$_2$OC(=O)CH=CH$_2$]$_2$
—CH$_2$CH$_2$CH$_2$OC(=O)CH=CH$_2$
—CH$_2$CH$_2$CH$_2$OCH$_2$CH$_2$OC(=O)CH=CH$_2$
—CH$_2$CH$_2$CH$_2$OC(=O)C(CH$_3$)=CH$_2$
—CH$_2$CH$_2$CH$_2$OCH$_2$CH$_2$OC(=O)C(CH$_3$)=CH$_2$
—CH$_2$CH$_2$Si[OSi(CH$_3$)$_2$CH$_2$OC(=O)CH=CH$_2$]$_3$
—CH$_2$CH$_2$Si[OSi(CH$_3$)$_2$CH$_2$OC(=O)C(CH$_3$)=CH$_2$]$_3$

[Chem. 24]

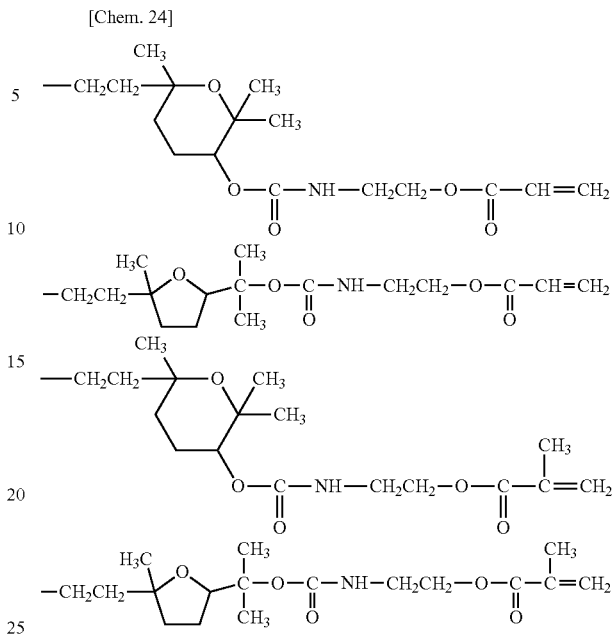

Inter alia, the following are most preferred.

—CH$_2$CH$_2$CH$_2$OCH$_2$CH$_2$OC(=O)NHCH$_2$CH$_2$OC(=O)CH=CH$_2$
—CH$_2$CH$_2$CH$_2$OCH$_2$CH$_2$OC(=O)NHC(CH$_3$)[CH$_2$OC(=O)CH=CH$_2$]$_2$
—CH$_2$CH$_2$Si[OSi(CH$_3$)$_2$CH$_2$OC(=O)CH=CH$_2$]$_3$

[Chem. 25]

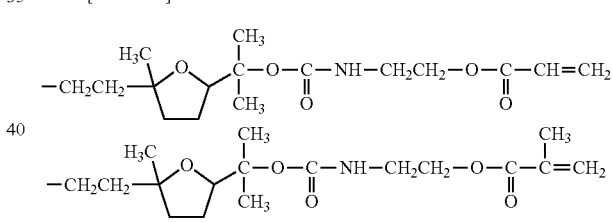

Examples of component (A) as defined above include compounds of the following structures.

[Chem. 26]

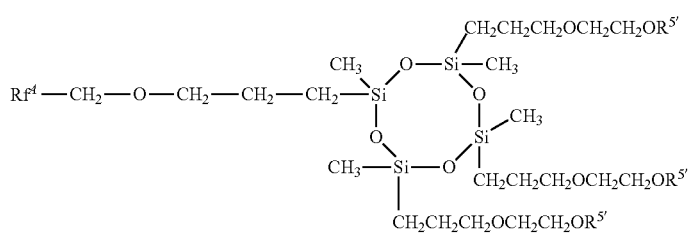

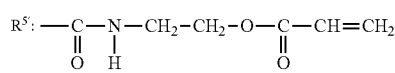

[Chem. 27]
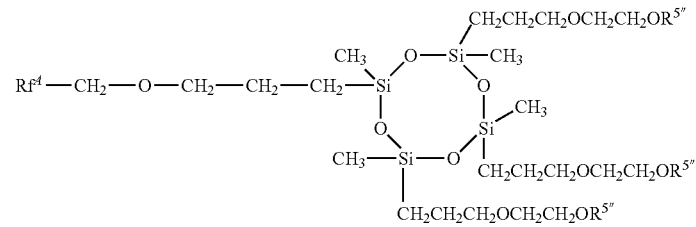
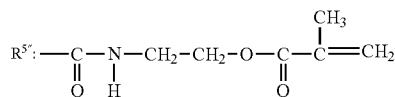
[Chem. 28]
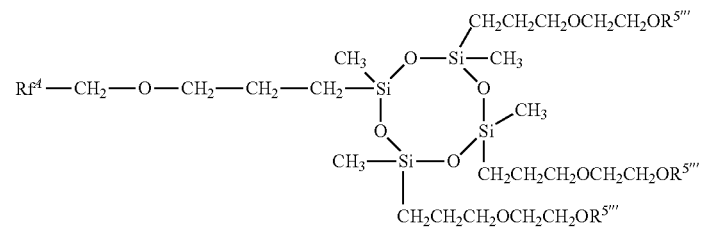
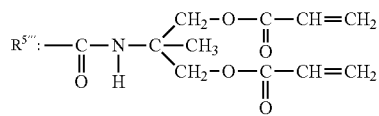
[Chem. 29]
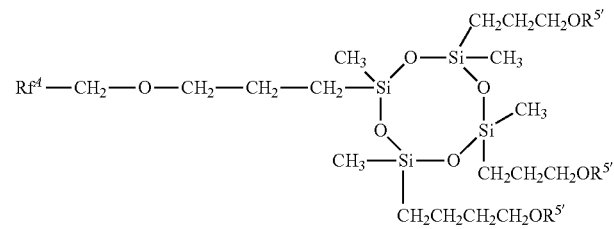
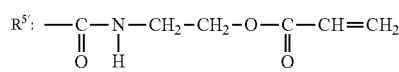
[Chem. 30]
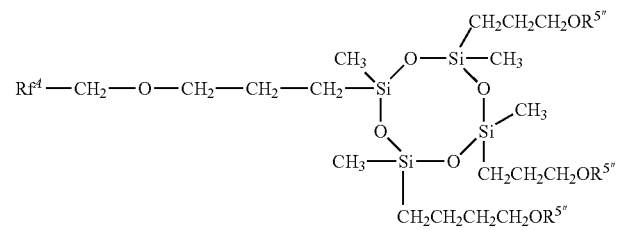
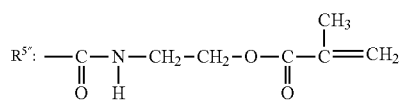
[Chem. 31]
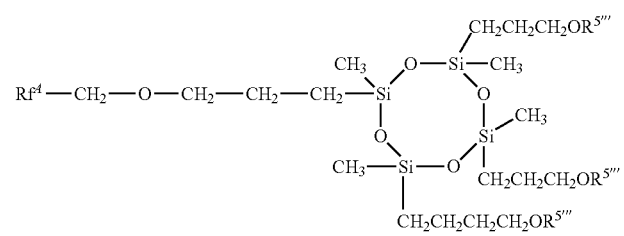

-continued
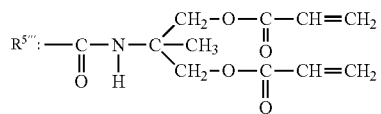
[Chem. 32]
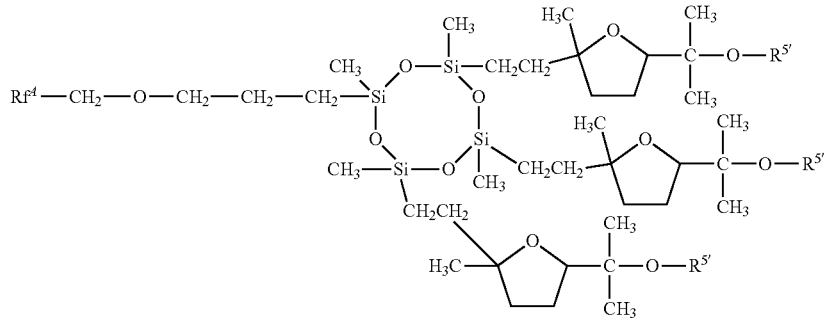
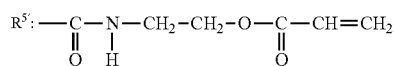
[Chem. 33]
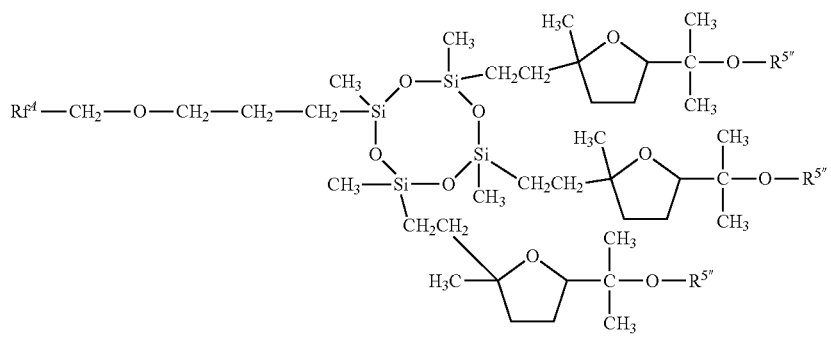
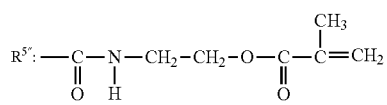
[Chem. 34]
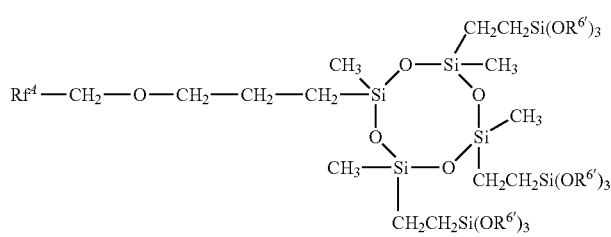
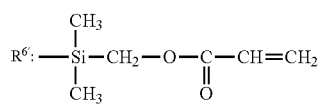
[Chem. 35]
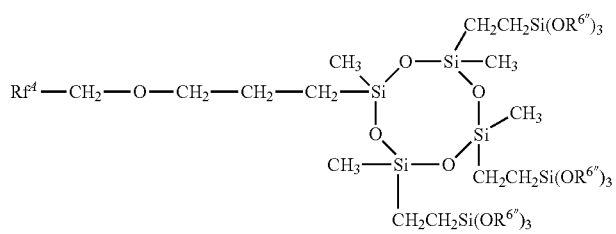

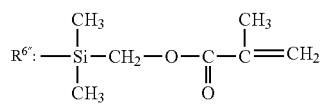

-continued

Herein $Rf^4$ is as defined above, preferably $CF_3O—(CF_2O)_m(CF_2CF_2O)_n—CF_2—$, m, n and m+n are as defined above.

One exemplary method of synthesizing the fluorinated acrylic compound having the general formula (1):

$$Rf^4—Z^1-Q^1[X^1]_a \quad (1)$$

wherein $Rf^4$, $Z^1$, $Q^1$, $X^1$, and "a" are as defined above, as component (A) involves the step of effecting hydrosilylation reaction of a fluorinated compound terminated with "a" number of Si—H groups, having the general formula (5):

$$Rf^4—Z^1-Q^1[H]_a \quad (5)$$

wherein $Rf^4$, $Z^1$, $Q^1$, and "a" are as defined above, and all "a" number of H atoms embraced within brackets are attached to silicon atoms in the $Q^1$ structure, with an unsaturated group-terminated alcohol having the general formula (6):

$$CH_2=CR^4—Z^3—OH \quad (6)$$

wherein $R^4$ and $Z^3$ are as defined above, thereby forming a fluorinated alcohol compound as an intermediate.

The following structure is exemplary of the fluorinated compound terminated with "a" number of Si—H groups, having formula (5).

[Chem. 36]

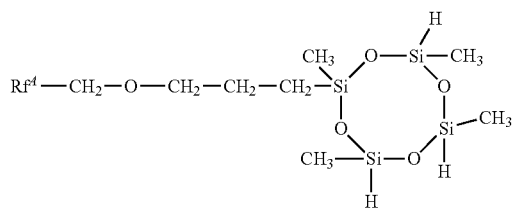

Herein $Rf^4$ is as defined above.

Examples of the unsaturated group-terminated alcohol having formula (6) are shown below.

$CH_2=CH—CH_2—OH$
$CH_2=CH—CH_2OCH_2CH_2—OH$

[Chem. 37]

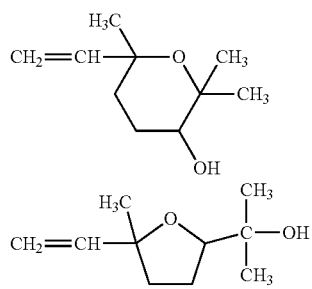

The hydrosilylation (addition) reaction is desirably carried out by mixing a fluorinated compound terminated with "a" number of Si—H groups, having formula (5) with an unsaturated group-terminated alcohol having formula (6), and heating the mixture in the presence of a platinum group metal-based addition reaction catalyst at a temperature of 50 to 150° C., preferably 60 to 120° C. for 1 minute to 48 hours, preferably 10 minutes to 12 hours. If the reaction temperature is too low, the reaction will stop before proceeding to a full extent. If the reaction temperature is too high, a temperature rise due to the heat of hydrosilylation reaction will make it impossible to control the reaction, sometimes causing bumping or decomposition of reactants.

In the reaction, the fluorinated compound terminated with "a" number of Si—H groups, having formula (5) and the unsaturated group-terminated alcohol having formula (6) are preferably used in such a ratio that the molar amount of terminal unsaturated groups in the unsaturated group-terminated alcohol having formula (6) is 0.5 to 5 times, especially 0.9 to 2 times the total molar amount of [H] in the fluorinated compound terminated with "a" number of Si—H groups, having formula (5). If the amount of the unsaturated group-terminated alcohol having formula (6) is less than the range, it may become difficult to obtain a fluorinated alcohol compound having high solubility. If the amount is larger than the range, the reaction solution loses uniformity and the reaction rate becomes unstable, and when the unsaturated group-terminated alcohol having formula (6) is removed at the end of reaction, the conditions of heating, decompression and extraction must be set severer by an extent corresponding to the increased amount of excessive unreacted alcohol.

The addition reaction catalyst used herein may be selected, for example, from compounds containing platinum group metals such as platinum, rhodium and palladium. Among others, platinum-containing compounds are preferred. Use may be made of hexachloroplatinate(IV) hexahydrate, platinum carbonylvinylmethyl complex, platinum-divinyltetramethyldisiloxane complex, platinum-cyclovinylmethylsiloxane complex, platinum-octylaldehyde/octanol complex, or platinum on active carbon.

The addition reaction catalyst is preferably used in such an amount as to provide 0.1 to 5,000 ppm by weight, more preferably 0.2 to 1,000 ppm by weight of metal based on the weight of the fluorinated compound terminated with "a" number of Si—H groups, having formula (5).

Although the addition reaction may be carried out in the absence of a solvent, the reaction mixture may be diluted with a solvent. As the diluting solvent, any organic solvents which are widely used in the art such as toluene, xylene, and isooctane may be used. Preference is given to the solvent which has a boiling point higher than the reaction temperature, which does not hinder the reaction, and in which the fluorinated alcohol compound formed at the end of reaction is soluble at the reaction temperature. The desired solvents are, for example, partially fluorine-modified solvents including fluorine-modified aromatic hydrocarbon solvents such as m-xylene hexafluoride and benzotrifluoride, and fluorine-modified ether solvents such as methyl perfluorobutyl ether, with m-xylene hexafluoride being preferred.

When used, the solvent is preferably used in an amount of 5 to 2,000 parts by weight, more preferably 50 to 500 parts by weight per 100 parts by weight of the fluorinated compound terminated with "a" number of Si—H groups, having formula (5). If the amount of the solvent is less than the range, the effect of solvent dilution wanes. If the amount is larger than the range, the degree of dilution becomes too high, sometimes inviting deceleration of a reaction rate.

After the completion of reaction, the unreacted unsaturated group-terminated alcohol having formula (6) and the dilution solvent are preferably removed by well-known means such as vacuum distillation, extraction or adsorption. Alternatively, the reaction mixture containing these ingredients may be used as such in the subsequent reaction.

By effecting the hydrosilylation reaction of the fluorinated compound terminated with "a" number of Si—H groups, having formula (5) with the unsaturated group-terminated alcohol having formula (6) in the above-mentioned way, there is obtained a fluorinated alcohol compound having the general formula (7):

Rf$^4$—Z$^1$-Q$^1$[CH$_2$—CHR$^4$—Z$^3$—OH]$_a$ (7)

wherein Rf$^4$, Z$^1$, Q$^1$, R$^4$, Z$^3$, and "a" are as defined above, all the "a" number of CH$_2$ embraced in brackets are attached to silicon atoms in the Q$^1$ structure.

Examples of the fluorinated alcohol compound having formula (7) are shown below.

Herein Rf$^4$ is as defined above.

Next, the fluorinated alcohol compound having formula (7) is converted to the target fluorinated acrylic compound by introducing a (meth)acryloyl group into the alcohol compound.

The method of introducing a (meth)acryloyl group into the fluorinated alcohol compound having formula (7) may be either one method of reacting the alcohol compound with a (meth)acrylic halide having the following formula (8) to form an ester or another method of reacting the alcohol compound with a (meth)acryloyl-containing isocyanate compound having the following formula (9a) or (9b). From these methods, the fluorinated acrylic compound having formula (1) is obtainable.

XC(=O)CR$^3$=CH$_2$ (8)

O=C=N—CH$_2$CH$_2$OC(=O)CR$^3$=CH$_2$ (9a)

O=C=N—C(CH$_3$)[CH$_2$OC(=O)CR$^3$=CH$_2$]$_2$ (9b)

Herein X is halogen, and R$^3$ is hydrogen or methyl.

Examples of the (meth)acrylic halide having formula (8) are shown below.

XC(=O)CH=CH$_2$

XC(=O)C(CH$_3$)=CH$_2$

Herein X is as defined above.

[Chem. 38]

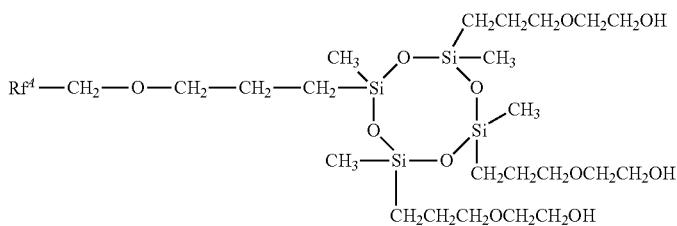

[Chem. 39]

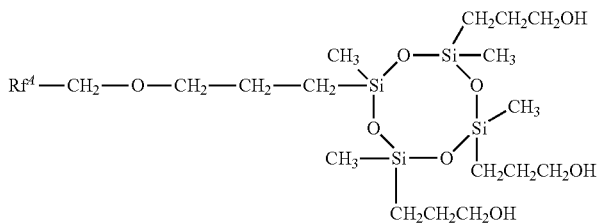

[Chem. 40]

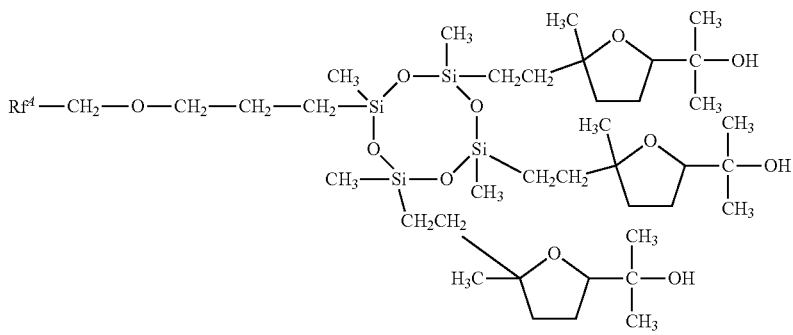

Inter alia, acrylic chloride and methacrylic chloride are preferred.

Examples of the (meth)acryloyl-containing isocyanate compound having formula (9a) or (9b) are shown below.

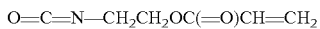

O=C=N—CH$_2$CH$_2$OC(=O)CH=CH$_2$

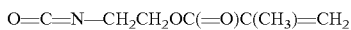

O=C=N—CH$_2$CH$_2$OC(=O)C(CH$_3$)=CH$_2$

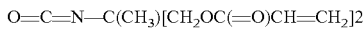

O=C=N—C(CH$_3$)[CH$_2$OC(=O)CH=CH$_2$]$_2$

The (meth)acrylic halide or (meth)acryloyl-containing isocyanate compound may be charged for reaction in at least an equimolar amount to the total of hydroxy groups in the fluorinated alcohol compound so that all hydroxy groups are reacted. Since it suffices that on the average, at least 1 mole of (meth)acryloyl groups are introduced per mole of the fluorinated alcohol compound, another setting is to keep hydroxy groups in excess so that the (meth)acrylic halide or (meth)acryloyl-containing isocyanate compound may not be left unreacted. Specifically, provided that the amount of the fluorinated alcohol compound in the reaction system is x moles and the total of hydroxy groups in the fluorinated alcohol compound is y moles, the amount of the (meth) acrylic halide or (meth)acryloyl-containing isocyanate compound is preferably from x moles to 2y moles, more preferably from 0.6y moles to 1.4y moles. If the amount is too small, there is a strong possibility that the fluorinated alcohol compound having no (meth)acryloyl groups introduced at all is left behind and the product has a low solubility. If the amount is too large, it is difficult to remove the unreacted or remaining (meth)acrylic halide or (meth)acryloyl-containing isocyanate compound.

The above reaction may be carried out, if desired, after the reaction mixture is diluted with a suitable solvent. The solvent used herein is not particularly limited as long as it is unreactive with the hydroxy group of the fluorinated alcohol compound, halogen atom of the (meth)acrylic halide, and isocyanate group of the (meth)acryloyl-containing isocyanate compound. Suitable solvents include hydrocarbon solvents such as toluene, xylene and isooctane, ether solvents such as tetrahydrofuran (THF), diisopropyl ether and dibutyl ether, ketone solvents such as acetone, methyl ethyl ketone, methyl butyl ketone, methyl isobutyl ketone, and cyclohexanone, fluorine-modified aromatic hydrocarbon solvents such as m-xylene hexafluoride (also known as hexafluoro-m-xylene) and benzotrifluoride, and fluorine-modified ether solvents such as methyl perfluorobutyl ether. The solvent may be removed at the end of reaction by any well-known means such as vacuum distillation, although the diluted solution may be directly used depending on the intended application.

Although the amount of the solvent used is not particularly limited, the amount is preferably up to 10 times the total weight of reactants. If the amount of the solvent used is too large, there is a risk of noticeably decelerating the reaction rate.

Upon the reaction, a polymerization inhibitor may be added if necessary. The polymerization inhibitor used herein is not particularly limited as long as it is commonly used for acrylic compounds. Examples include hydroquinone, hydroquinone monomethyl ether, 4-tert-butyl catechol, and dibutyl hydroxytoluene. The amount of the polymerization inhibitor used is not particularly limited and may be determined in accordance with the reaction conditions, purifying conditions after the reaction, and final use conditions. Often, the amount is preferably 0.01 to 5,000 ppm, more preferably 0.1 to 500 ppm based on the total weight of reactants.

When the (meth)acrylic halide, preferably acrylic chloride or methacrylic chloride is reacted with the fluorinated alcohol compound to form an ester, this ester forming reaction is carried out by adding dropwise the (meth)acrylic halide while mixing and stirring the reaction intermediate (fluorinated alcohol compound) and an acid acceptor. The acid acceptor used herein is selected from triethylamine, pyridine, and urea. The amount of the acid acceptor used is desirably about 0.9 to 3 times the moles of the (meth)acrylic halide charged. If the amount is too small, more acid is left untrapped. If the amount is too large, it is difficult to remove the excess of acid acceptor.

The dropwise addition of the (meth)acrylic halide is performed over 20 to 60 minutes while maintaining the reaction mixture at a temperature of 0 to 35° C. Thereafter, stirring is continued for a further 30 minutes to 10 hours. At the end of reaction, the unreacted (meth)acrylic halide, the salt formed by the reaction, reaction solvent and the like are removed by such means as distillation, adsorption, filtration or washing whereupon the fluorinated acrylic compound having formula (1) is obtained.

After the reaction is stopped, an alcohol compound such as methanol or ethanol may be added to the reaction system, whereby the unreacted (meth)acrylic halide is esterified. The (meth)acrylate formed may be removed by the same means as the removal of the unreacted (meth)acrylic halide although the reaction product having the (meth)acrylate left therein may be used as such.

When the fluorinated alcohol compound is reacted with the (meth)acryloyl-containing isocyanate compound, the reactants are stirred along with the solvent, if any, for advancing the reaction.

In the reaction, a suitable catalyst may be added for accelerating the reaction rate. Examples of the catalyst include alkyl tin esters such as dibutyltin diacetate, dibutyltin dilaurate, dibutyltin dioctoate, dioctyltin diacetate, dioctyltin dilaurate, dioctyltin dioctate, stannous dioctanoate; titanic acid esters or titanium chelates such as tetraisopropoxytitanium, tetra-n-butoxytitanium, tetrakis(2-ethylhexoxy) titanium (also known as tetrakis(2-ethylhexyl) orthotitanate), dipropoxybis(acetylacetonato)titanium, titanium isopropoxyoctylene glycol; and zirconium chelates such as zirconium tetraacetylacetonate, zirconium tributoxymonoacetylacetonate, zirconium monobutoxyacetylacetonate bis(ethylacetoacetate), zirconium dibutoxybis(ethylacetoacetate), zirconium tetraacetylacetonate. These compounds may be used alone or in admixture of two or more. From the aspect of reactivity, titanium compounds and tin compounds are preferably used. The reaction rate can be increased by adding the catalyst in an amount of 0.01 to 2% by weight, preferably 0.05 to 10% by weight based on the total weight of reactants.

The reaction is carried out at a temperature of 0 to 120° C., preferably 10 to 70° C., for 1 minute to 50 hours, preferably 10 minutes to 48 hours. If the reaction temperature is too low, the reaction rate may become too low. If the reaction temperature is too high, polymerization of (meth) acryloyl groups can take place as a side reaction.

After the completion of reaction, the fluorinated acrylic compound having formula (1) is obtained by removing the unreacted isocyanate compound and reaction solvent by such means as distillation, adsorption, filtration or washing.

Also, after the reaction is stopped, an alcohol compound such as methanol or ethanol may be added to the reaction system to form a urethane bond with the unreacted isocyanate compound. The resulting urethane (meth)acrylate may be removed by the same means as used for the unreacted isocyanate compound although the reaction mixture having the urethane (meth)acrylate left therein may be used as such.

The other preferred method of synthesizing the fluorinated acrylic compound having formula (1) is, for example, by effecting hydrosilylation reaction of the fluorinated compound terminated with "a" number of Si—H groups having formula (5) with an unsaturated group-terminated reactive silane compound having the general formula (10):

$$CH_2=CR^4-(Z^4)_d-SiR^7_cM_{3-c} \qquad (10)$$

wherein $R^4$, $Z^4$, $R^7$, d, and c are as defined above, and M is each independently an alkoxy or alkoxyalkoxy group, to form a reactive fluorinated silane compound as an intermediate.

In formula (10), M is an alkoxy or alkoxyalkoxy group, examples of which include $C_{1-9}$ alkoxy groups such as methoxy, ethoxy and propoxy, and $C_{2-10}$ alkoxyalkoxy groups such as methoxymethoxy, methoxyethoxy, ethoxymethoxy, and ethoxyethoxy.

Examples of the unsaturated group-terminated reactive silane compound having formula (10) are shown below.

$CH_2=CHSi(OCH_3)_3$
$CH_2=CHCH_2Si(OCH_3)_3$
$CH_2=CHCH_2CH_2Si(OCH_3)_3$
$CH_2=CHCH_2CH_2CH_2Si(OCH_3)_3$
$CH_2=CHCH_2CH_2CH_2CH_2CH_2Si(OCH_3)_3$
$CH_2=CHSi(OC_2H_5)_3$
$CH_2=CHCH_2Si(OC_2H_5)_3$
$CH_2=CHCH_2CH_2Si(OC_2H_5)_3$
$CH_2=CHCH_2CH_2CH_2Si(OC_2H_5)_3$
$CH_2=CHCH_2CH_2CH_2CH_2CH_2Si(OC_2H_5)_3$
$CH_2=CHSi(OC_3H_7)_3$
$CH_2=CHCH_2Si(OC_3H_7)_3$
$CH_2=CHCH_2CH_2Si(OC_3H_7)_3$
$CH_2=CHCH_2CH_2CH_2CH_2CH_2Si(OC_3H_7)_3$
$CH_2=CHSiCH_3(OCH_3)_2$
$CH_2=CHCH_2SiCH_3(OCH_3)_2$
$CH_2=CHCH_2CH_2CH_2CH_2SiCH_3(OCH_3)_2$
$CH_2=CHSiCH_3(OC_2H_5)_2$
$CH_2=CHCH_2SiCH_3(OC_2H_5)_2$
$CH_2=CHCH_2CH_2SiCH_3(OC_2H_5)_2$
$CH_2=CHCH_2CH_2CH_2CH_2SiCH_3(OC_2H_5)_2$

Among these, the following are preferred.

$CH_2=CHSi(OCH_3)_3$
$CH_2=CHCH_2Si(OCH_3)_3$
$CH_2=CHCH_2CH_2Si(OCH_3)_3$
$CH_2=CHCH_2CH_2CH_2Si(OCH_3)_3$
$CH_2=CHCH_2CH_2CH_2CH_2CH_2Si(OCH_3)_3$
$CH_2=CHSi(OC_2H_5)_3$
$CH_2=CHCH_2Si(OC_2H_5)_3$

When the fluorinated compound terminated with "a" number of Si—H groups having formula (5) is reacted with the unsaturated group-terminated reactive silane compound having formula (10), the desired procedure is by mixing and stirring the reactants, and effecting reaction in the presence of a platinum group metal based addition reaction catalyst at a temperature of 50 to 150° C., preferably 60 to 120° C. for 1 minute to 72 hours, preferably 5 minutes to 12 hours. If the reaction temperature is too low, the reaction will stop before proceeding to a full extent. If the reaction temperature is too high, a temperature rise due to the heat of hydrosilylation reaction will make it impossible to control the reaction, sometimes causing bumping or decomposition of reactants.

In the reaction, the fluorinated compound terminated with "a" number of Si—H groups, having formula (5) and the unsaturated group-terminated reactive silane compound having formula (10) are preferably used in such a ratio that the molar amount of unsaturated groups in the unsaturated group-terminated reactive silane compound having formula (10) is 0.1 to 5 times, especially 0.8 to 2 times the total molar amount of [H] in the fluorinated compound terminated with "a" number of Si—H groups, having formula (5). If the amount of the unsaturated group-terminated reactive silane compound having formula (10) is less than the range, there arises a possibility that the desired effect is not obtained because more Si—H groups are left in the fluoropolyether compound containing polyfunctional Si—H groups, having formula (5). If the amount is larger than the range, the reaction solution loses uniformity and the reaction rate becomes unstable, and when the unsaturated group-terminated reactive silane compound having formula (10) is removed at the end of reaction, the conditions of heating, decompression and extraction must be set severer by an extent corresponding to the increased amount of excessive unreacted component.

The addition reaction catalyst used herein may be selected, for example, from compounds containing platinum group metals such as platinum, rhodium and palladium. Among others, platinum-containing compounds are preferred. Use may be made of hexachloroplatinate(IV) hexahydrate, platinum carbonylvinylmethyl complex, platinum-divinyltetramethyldisiloxane complex, platinum-cyclovinylmethylsiloxane complex, platinum-octylaldehyde/octanol complex, complexes of chloroplatinic acid with olefins, aldehydes, vinylsiloxanes or acetylene alcohols, or platinum on active carbon.

The addition reaction catalyst is preferably used in such an amount as to provide 0.1 to 5,000 ppm by weight, more preferably 0.2 to 1,000 ppm by weight of metal based on the weight of the fluoropolyether compound containing polyfunctional Si—H groups, having formula (10).

Although the addition reaction may be carried out in the absence of a solvent, the reaction mixture may be diluted with a solvent if necessary. As the diluting solvent, any organic solvents which are widely used in the art such as toluene, xylene, and isooctane may be used. Preference is given to the solvent which has a boiling point higher than the desired reaction temperature, which does not hinder the reaction, and in which the reactive fluorinated silane compound formed at the end of reaction is soluble at the reaction temperature. The desired solvents are, for example, partially fluorine-modified solvents including fluorine-modified aromatic hydrocarbon solvents such as m-xylene hexafluoride and benzotrifluoride, and fluorine-modified ether solvents such as methyl perfluorobutyl ether, with m-xylene hexafluoride being preferred.

When used, the solvent is preferably used in an amount of 5 to 2,000 parts by weight, more preferably 50 to 500 parts by weight per 100 parts by weight of the fluorinated compound terminated with "a" number of Si—H groups, having formula (5). If the amount of the solvent is less than the range, the effect of solvent dilution wanes. If the amount is larger than the range, the degree of dilution becomes too high, sometimes inviting deceleration of reaction rate.

After the completion of reaction, the unreacted unsaturated group-terminated reactive silane compound having formula (10) and the dilution solvent are preferably removed by well-known means such as vacuum distillation, extraction or adsorption. Alternatively, the reaction mixture containing these ingredients may be used as such in the subsequent reaction.

By effecting the reaction of the fluorinated compound terminated with "a" number of Si—H groups, having formula (5) with the unsaturated group-terminated reactive silane compound having formula (10) in the above-mentioned way, there is obtained a reactive fluorinated silane compound having the general formula (11):

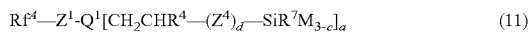  (11)

wherein $Rf^4$, $Z^1$, $Q^1$, $R^4$, $Z^4$, d, $R^7$, c, M, and "a" are as defined above.

Examples of the reactive fluorinated silane compound having formula (11) are shown below.

[Chem. 41]

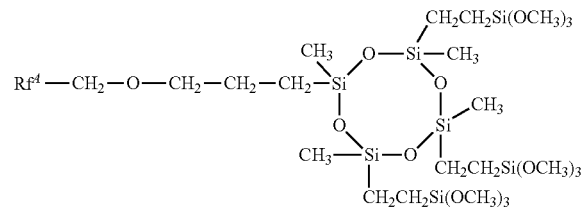

[Chem. 42]

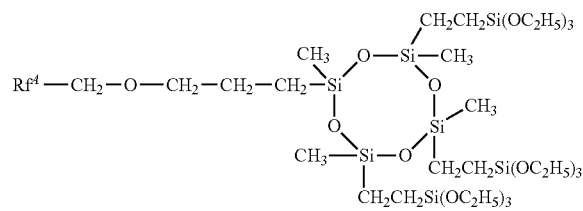

Herein $Rf^4$ is as defined above.

Next, the reactive fluorinated silane compound having formula (11) is reacted with a silanol compound containing a diorganosilylene group and a (meth)acryloyl group, to form the target fluorinated acrylic compound.

Examples of the silanol compound containing a diorganosilylene group and a (meth)acryloyl group are shown below.

$HOSi(CH_3)_2CH_2OC(=O)CH=CH_2$
$HOSi(CH_3)_2CH_2OC(=O)C(CH_3)=CH_2$
$HOSi(CH_3)_2CH_2CH_2OC(=O)CH=CH_2$
$HOSi(CH_3)_2CH_2CH_2OC(=O)C(CH_3)=CH_2$
$HOSi(CH_3)_2CH_2CH_2CH_2OC(=O)CH=CH_2$
$HOSi(CH_3)_2CH_2CH_2CH_2OC(=O)C(CH_3)=CH_2$

Inter alia, the following are preferred.
$HOSi(CH_3)_2CH_2OC(=O)CH=CH_2$
$HOSi(CH_3)_2CH_2OC(=O)C(CH_3)=CH_2$ When the reactive fluorinated silane compound having formula (11) is reacted with the silanol compound containing a diorganosilylene group and a (meth)acryloyl group, the desired procedure is by stirring the reactants, along with a catalyst and a solvent, if necessary. The reaction may be carried out at a temperature of 0 to 120° C., preferably 10 to 70° C. for 1 minute to 300 hours, preferably 30 minutes to 72 hours. If the reaction temperature is too low, the reaction rate may become low. If the reaction temperature is too high, polymerization of (meth)acryloyl groups and dehydrating condensation of the silanol compound containing a diorganosilylene group and a (meth)acryloyl group can take place as side reactions.

In the reaction of the reactive fluorinated silane compound having formula (11) with the silanol compound containing a diorganosilylene group and a (meth)acryloyl group, the molar amount of the silanol compound containing a diorganosilylene group and a (meth)acryloyl group used is 0.9 to 2 times, preferably 0.95 to 1.1 times the total moles of M in the reactive fluorinated silane compound having formula (11) in the reaction system. An alternative procedure is by using the silanol compound containing a diorganosilylene group and a (meth)acryloyl group in excess of the total moles of M in the fluorinated reactive silane compound having formula (11), interrupting the reaction halfway at an appropriate conversion rate, and removing the excess of the silanol compound.

In the reaction, a suitable catalyst may be added for accelerating the reaction rate. In the case of the reactive fluorinated silane compound having formula (11) wherein M is an alkoxy group, examples of the catalyst include alkyl tin esters such as dibutyltin diacetate, dibutyltin dilaurate, dibutyltin dioctoate, dioctyltin diacetate, dioctyltin dilaurate, dioctyltin dioctate, stannous dioctanoate; titanic acid esters or titanium chelates such as tetraisopropoxytitanium, tetra-n-butoxytitanium, titanium tetra-2-ethylhexoxide, dipropoxybis(acetylacetonato)titanium, titanium isopropoxyoctylene glycol; zirconium chelates such as zirconium tetraacetylacetonate, zirconium tributoxymonoacetylacetonate, zirconium monobutoxyacetylacetonate bis (ethylacetoacetate), zirconium dibutoxybis (ethylacetoacetate), zirconium tetraacetylacetonate; and alkaline earth hydroxides such as magnesium hydroxide, calcium hydroxide, strontium hydroxide and barium hydroxide. These compounds may be used alone or in admixture of two or more. Of these, titanium compounds, zirconium compounds and alkaline earth hydroxides are preferably used because they have a less impact on the environment.

The reaction rate can be increased by adding the catalyst in an amount of 0.01 to 10% by weight, more preferably 0.01 to 5% by weight based on the total weight of reactants.

The above reaction may be carried out, if desired, after the reaction mixture is diluted with a suitable solvent. The solvent used herein is not particularly limited as long as it does not directly react with reactive groups in the reaction system. Suitable solvents include hydrocarbon solvents such as toluene, xylene and isooctane, ether solvents such as tetrahydrofuran (THF), diisopropyl ether and dibutyl ether, ketone solvents such as acetone, methyl ethyl ketone, methyl butyl ketone, methyl isobutyl ketone, and cyclohexanone, fluorine-modified aromatic hydrocarbon solvents such as m-xylene hexafluoride and benzotrifluoride, and fluorine-modified ether solvents such as methyl perfluorobutyl ether. The solvent may be removed at the end of reaction by any well-known means such as vacuum distillation, although the diluted solution may be directly used depending on the intended application.

When used, the amount of the solvent used is preferably 0.1 to 1,000 parts by weight, more preferably 20 to 500 parts by weight per 100 parts by weight in total of the reactive fluorinated silane compound having formula (11) with the silanol compound containing a diorganosilylene group and a (meth)acryloyl group. If the amount of the solvent used is larger than the range, the concentration of the reaction system becomes so low that the reaction rate may be largely decelerated.

Upon the reaction, a polymerization inhibitor may be added if necessary. The polymerization inhibitor used herein is not particularly limited as long as it is commonly used for acrylic compounds. Examples include hydroquinone, hydroquinone monomethyl ether, 4-tert-butyl catechol, and dibutyl hydroxytoluene. The amount of the polymerization inhibitor used is not particularly limited and may be determined in accordance with the reaction conditions, purifying conditions after the reaction, and final use conditions. Often, the amount is preferably 0.01 to 5,000 ppm, more preferably 0.1 to 500 ppm based on the total weight of reactants.

After the completion of reaction, the unreacted silanol compound containing a diorganosilylene group and a (meth) acryloyl group and the reaction solvent are removed, if desired, by such means as distillation, adsorption, re-precipitation, filtration or washing, whereupon the fluorinated acrylic compound having formula (1) is obtained.

[Component (B)]

Component (B), which is a second essential component in the inventive curable fluorinated composition, is a compound in the form of a linear polymer having a fluoropolyether backbone, having at least two, preferably 2 to 5, more preferably 2 to 4 (meth)acryloyl groups at each end of the molecule (each of both ends of the molecular chain), and having on the average 4 to 10, preferably 4 to 8 (meth) acryloyl groups per molecule.

Typical of the compound is a fluorinated acrylic compound having the general formula (2).

[Chem. 43]

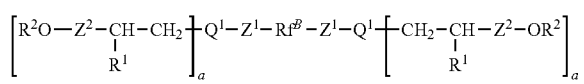

(2)

In formula (2), $Rf^B$ is a divalent perfluoropolyether group, which is represented by the formula: $-CF_2O-Rf^2-CF_2-$.

Herein $Rf^2$ is the same as $Rf^2$ in $Rf^4$ in the above formula (1) and its examples are as exemplified above for $Rf^2$.

In formula (2), $Z^1$ is independently the same as $Z^1$ in the above formula (1) and its examples are as exemplified above for $Z^1$. Among others, the following are preferred. It is noted that the hyphen on the left in the following structure is a point of attachment to $Rf^B$ and the hyphen on the right is a point of attachment to $Q^1$.

—$CH_2CH_2$—
—$CH_2CH_2CH_2$—
—$CH_2CH_2CH_2CH_2$—
—$CH_2OCH_2CH_2$—
—$CH_2OCH_2CH_2CH_2$—

In formula (2), $Q^1$ is independently the same as $Q^1$ in the above formula (1) and its examples are as exemplified above for $Q^1$. Among others, the following are preferred. It is noted that the hyphen from each of the (a1+1) number of units in the following structure is a point of attachment to any one of $Z^1$ and "a" number of $CH_2$ embraced in brackets.

[Chem. 44]

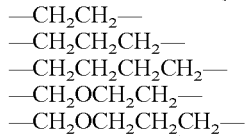

Herein a1 is 2 or 3.

In formula (2), $R^1$ is independently hydrogen or a $C_{1-8}$, preferably $C_{1-6}$ monovalent hydrocarbon group. Examples of the monovalent hydrocarbon group include alkyl groups such as methyl, ethyl, propyl, isopropyl, butyl, isobutyl, tert-butyl, pentyl, neopentyl, hexyl and octyl, cycloalkyl groups such as cyclohexyl, alkenyl groups such as vinyl, allyl and propenyl, aryl groups such as phenyl, tolyl and xylyl, and aralkyl groups such as benzyl and phenylethyl. $R^1$ is preferably hydrogen or methyl.

In formula (2), $R^2$ is independently hydrogen or a monovalent organic group having a (meth)acryloyl group, which may contain oxygen and/or nitrogen. The monovalent organic group is desirably a group terminated with at least one, preferably one or two (meth)acryloyl groups. The monovalent organic group may contain an amide bond, ether bond or ester bond halfway the structure.

Examples of the structure are shown below.

—C(=O)CH=$CH_2$
—C(=O)C($CH_3$)=$CH_2$
—C(=O)NHCH$_2$CH$_2$OC(=O)CH=$CH_2$
—C(=O)NHCH$_2$CH$_2$OC(=O)C($CH_3$)=$CH_2$
—C(=O)NHCH$_2$CH$_2$OCH$_2$CH$_2$OC(=O)C($CH_3$)=$CH_2$
—C(=O)NHC($CH_3$)($CH_2$CH$_2$OC(=O)CH=$CH_2$)$_2$

Of these, the following are most preferred.

—C(=O)NHCH$_2$CH$_2$OC(=O)CH=$CH_2$
—C(=O)NHCH$_2$CH$_2$OC(=O)C($CH_3$)=$CH_2$

In formula (2), "a" is independently an integer of 2 to 5, preferably 2 to 4, more preferably 2 or 3. If "a" is less than 2, a lowering of solubility in component (C) may occur. If "a" is more than 5, a lowering of solubility in component (A) may occur.

In formula (2), $Z^2$ is each independently a $C_{1-100}$, preferably $C_{1-40}$ divalent hydrocarbon group which may contain oxygen and/or nitrogen, and which may contain a cyclic structure halfway.

The preferred structures of $Z^2$ are shown below.

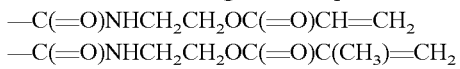

Herein d is an integer of 0 to 29, preferably 0 to 10, e is an integer of 0 to 29, preferably 0 to 10, f is an integer of 0 to 14, preferably 0 to 7, and c is an integer of 2 to 4. The total carbon count in the above structure is 3 to 100 carbon atoms, preferably 3 to 30 carbon atoms. The arrangement of repeat units is random independent of their type. Each repeat unit may be a mixture of structural isomers rather than a single unit.

[Chem. 45]

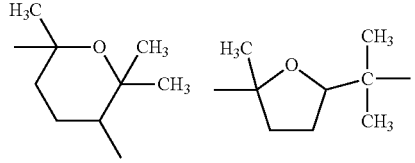

The following two structures are especially preferred as $Z^2$. Inter alia, those structures wherein d is an integer of 0 to 10 and e is an integer of 0 to 10 are most preferred. The hyphen on the left in the following structures is a point of attachment to $CHR^1$ and the hyphen on the right is a point of attachment to $OR^2$.

—$CH_2[OC_2H_4]_dOC_2H_4$—
—$CH_2[OC_3H_6]_eOCH_2CH(CH_3)$—

More preferred examples of the fluorinated acrylic compound having formula (2) include structures having the general formulae (3) and (4).

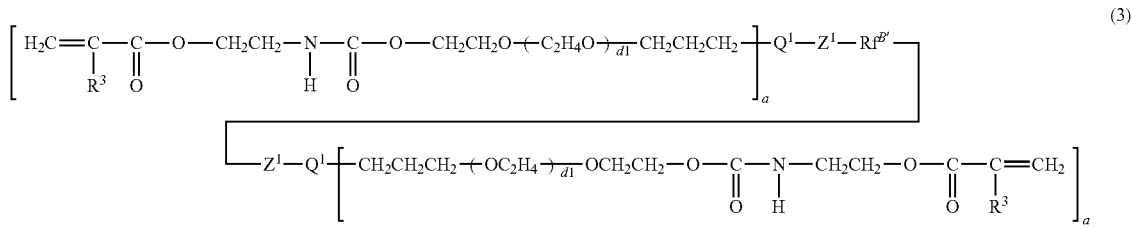
(3)
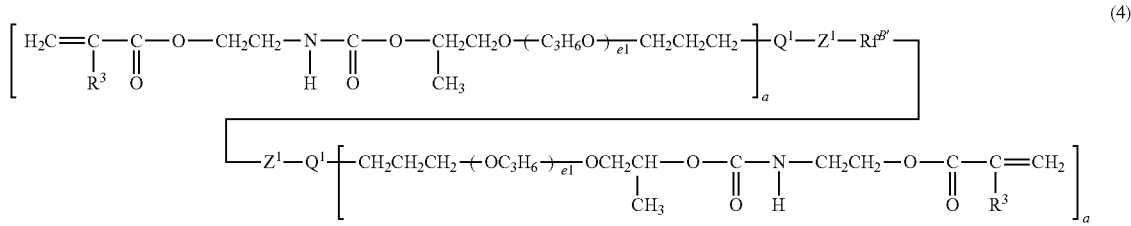
(4)
Herein $Z^1$, $Q^1$, and "a" are as defined above; $Rf^{B'}$ is —$CF_2O$ $(CF_2O)_m(CF_2CF_2O)_nCF_2$—; m, n and m+n are as defined above; the arrangement of —($CF_2O$)— and —($CF_2CF_2O$)— is random; $R^3$ is hydrogen or methyl; d1 and e1 each are an integer of 0 to 10.
Illustrative examples of component (B) are shown below.
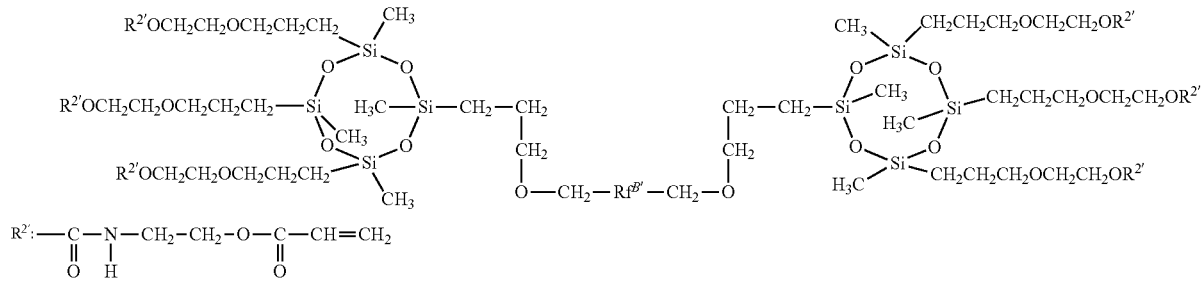
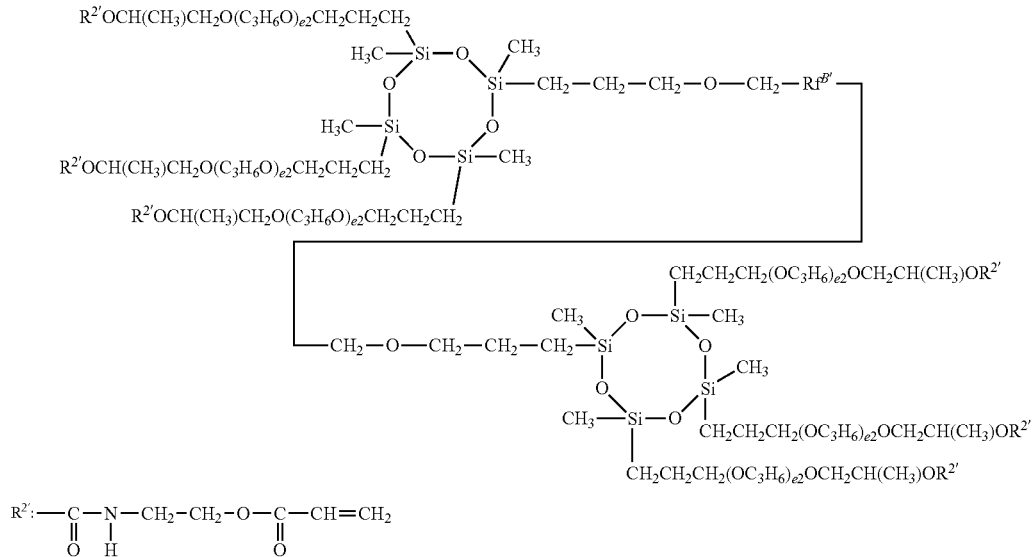

[Chem. 50]
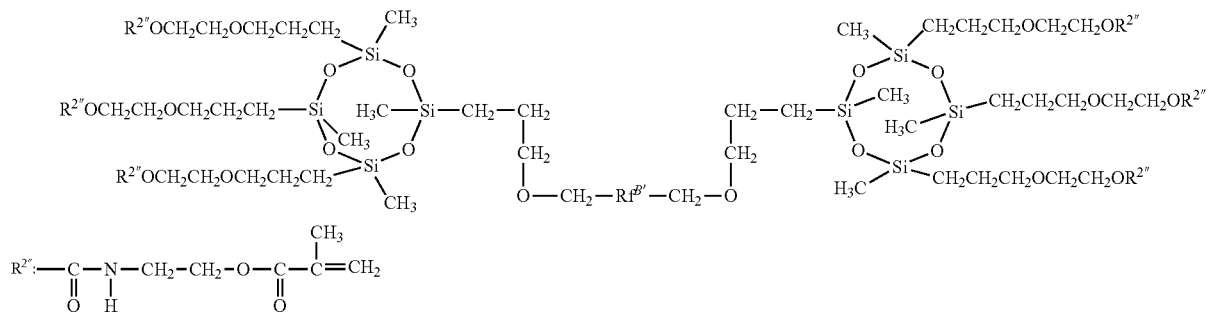
[Chem. 51]
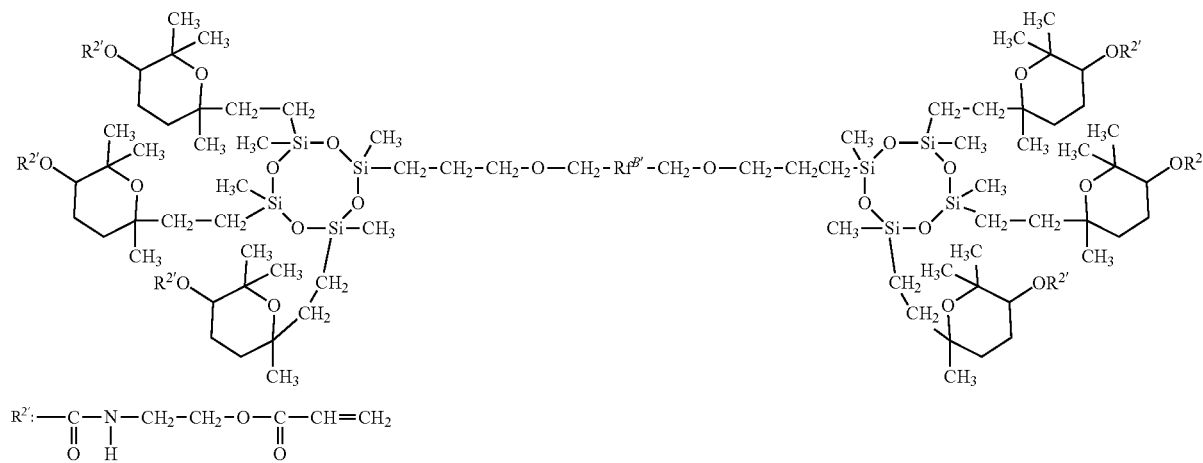
[Chem. 52]
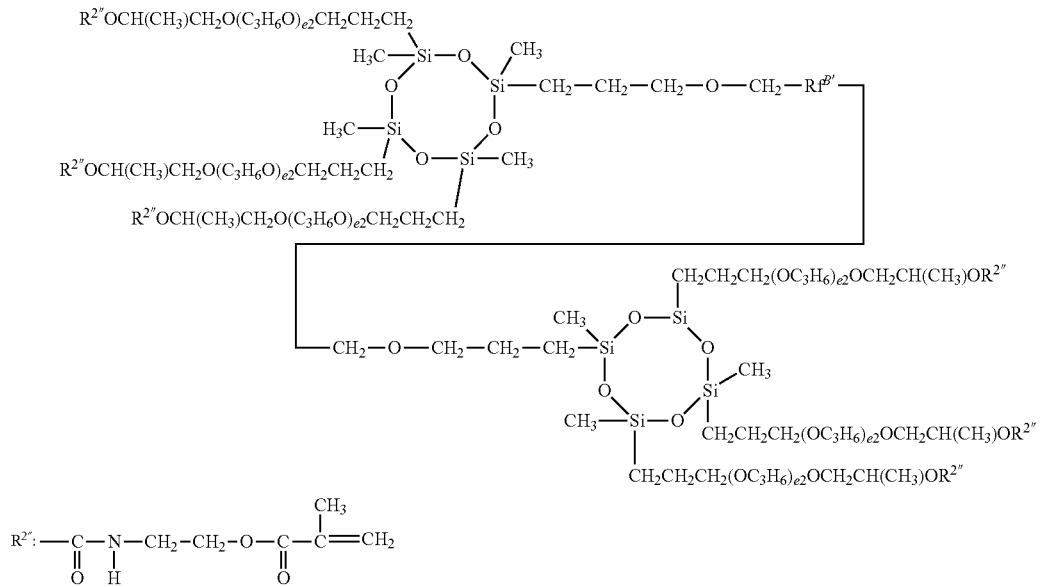

Herein $Rf^{B'}$ is as defined above, and e2 is an integer of 1 to 10, typically 4.

The fluorinated acrylic compound having formula (2) as component (B) may be synthesized, for example, by the methods described in JP-A 2010-285501 and JP-A 2015-199910.

For example, the fluorinated acrylic compound having formula (2) is synthesized by first effecting hydrosilylation reaction of a fluoropolyether compound having a polyfunctional Si—H group, represented by the general formula (12):

[Chem. 53]

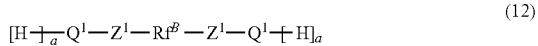

(12)

wherein $Rf^B$, $Z^1$, $Q^1$, and "a" are as defined above, all "a" number of H embraced in brackets are attached to silicon atoms in the $Q^1$ structure, with an unsaturated group-terminated alcohol (compound having an alkenyl group and a hydroxy group at ends of the molecule) represented by the general formula (13):

$CH_2=CR^1—Z^2—OH$ (13)

wherein $R^1$ and $Z^2$ are as defined above, to form a fluorinated alcohol compound as an intermediate.

Examples of the fluoropolyether compound having a polyfunctional Si—H group, represented by formula (12) are shown below.

[Chem. 54]

polyfunctional Si—H group, represented by formula (12) with an unsaturated group-terminated alcohol having formula (13), and heating the mixture in the presence of a platinum group metal-based addition reaction catalyst at a temperature of 50 to 150° C., preferably 60 to 120° C. for 1 minute to 48 hours, preferably 10 minutes to 12 hours. If the reaction temperature is too low, the reaction will stop before proceeding to a full extent. If the reaction temperature is too high, a temperature rise due to the heat of hydrosilylation reaction will make it impossible to control the reaction, sometimes causing bumping or decomposition of reactants.

In the reaction, the fluoropolyether compound having a polyfunctional Si—H group, represented by formula (12) and the unsaturated group-terminated alcohol having formula (13) are preferably reacted in such a ratio that the molar amount of terminal unsaturated groups in the unsaturated group-terminated alcohol having formula (13) is 0.5 to 5 times, especially 0.9 to 2 times the total molar amount of [H] in the fluoropolyether compound having a polyfunctional Si—H group, represented by formula (12). If the amount of the unsaturated group-terminated alcohol having formula (13) is less than the range, it may become difficult to obtain a fluorinated alcohol compound having high solubility. If the amount is larger than the range, the reaction solution loses uniformity and the reaction rate becomes unstable, and when the unsaturated group-terminated alcohol having formula (13) is removed at the end of reaction, the conditions of heating, decompression and extraction must be set severer by an extent corresponding to the increased amount of excessive unreacted alcohol.

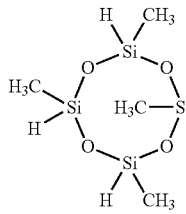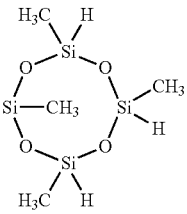

Herein $Rf^{B'}$ is as defined above.

Examples of the unsaturated group-terminated alcohol represented by formula (13) are shown below.

$CH_2=CH—CH_2—OCH_2CH_2—OH$
$CH_2=CH—CH_2—OCH_2CH(CH_3)—OH$
$CH_2=CH—CH_2—(OC_3H_6)_2—OCH_2CH(CH_3)—OH$
$CH_2=CH—CH_2—(OC_3H_6)_4—OCH_2CH(CH_3)—OH$
$CH_2=CH—CH_2—(OC_3H_6)_9—OCH_2CH(CH_3)—OH$

[Chem. 55]

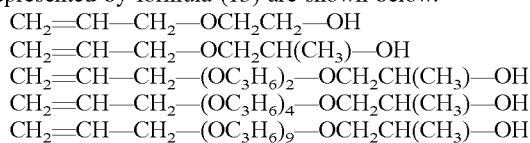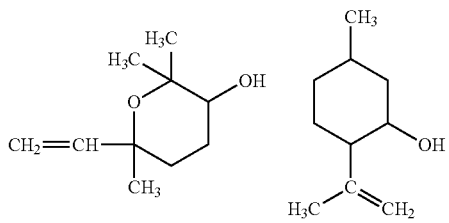

The hydrosilylation (addition) reaction is desirably carried out by mixing a fluoropolyether compound having a The addition reaction catalyst used herein may be selected, for example, from compounds containing platinum group metals such as platinum, rhodium and palladium. Among others, platinum-containing compounds are preferred. Use may be made of hexachloroplatinate(IV) hexahydrate, platinum carbonylvinylmethyl complex, platinum-divinyltetramethyldisiloxane complex, platinum-cyclovinylmethylsiloxane complex, platinum-octylaldehyde/octanol complex, or platinum on active carbon.

The addition reaction catalyst is preferably used in such an amount as to provide 0.1 to 5,000 ppm by weight, more preferably 0.2 to 1,000 ppm by weight of metal based on the weight of the fluoropolyether compound having a polyfunctional Si—H group, represented by formula (12).

Although the addition reaction can be carried out in the absence of a solvent, the reaction mixture may be diluted with a solvent if necessary. As the diluting solvent, any organic solvents which are widely used in the art such as toluene, xylene, and isooctane may be used. Preference is given to the solvent which has a boiling point higher than the reaction temperature, which does not hinder the reaction, and in which the fluorinated alcohol compound formed at the end of reaction is soluble at the reaction temperature. The desired solvents are, for example, partially fluorine-modified solvents including fluorine-modified aromatic hydrocarbon solvents such as m-xylene hexafluoride and benzotrifluoride, and fluorine-modified ether solvents such as methyl perfluorobutyl ether, with m-xylene hexafluoride being preferred.

When used, the solvent is preferably used in an amount of 5 to 2,000 parts by weight, more preferably 50 to 500 parts by weight per 100 parts by weight of the fluoropolyether compound having a polyfunctional Si—H group, represented by formula (12). If the amount of the solvent is less than the range, the effect of solvent dilution wanes. If the amount is larger than the range, the degree of dilution becomes too high, sometimes inviting deceleration of a reaction rate.

After the completion of reaction, the unreacted unsaturated group-terminated alcohol having formula (13) and the dilution solvent are preferably removed by well-known means such as vacuum distillation, extraction or adsorption. Alternatively, the reaction mixture containing these ingredients may be used as such in the subsequent reaction.

By effecting the hydrosilylation reaction of the fluoropolyether compound having a polyfunctional Si—H group, represented by formula (12) with the unsaturated group-terminated alcohol having formula (13) in the above-mentioned way, there is obtained a fluorinated alcohol compound having the general formula (14):

[Chem. 56]

(14)

wherein $Rf^B$, $Q^1$, $R^1$, $Z^1$, $Z^2$, and "a" are as defined above, all the "a" number of $CH_2$ embraced in brackets are attached to silicon atoms in the $Q^1$ structure.

Examples of the fluorinated alcohol compound having formula (14) are shown below.

[Chem. 57]

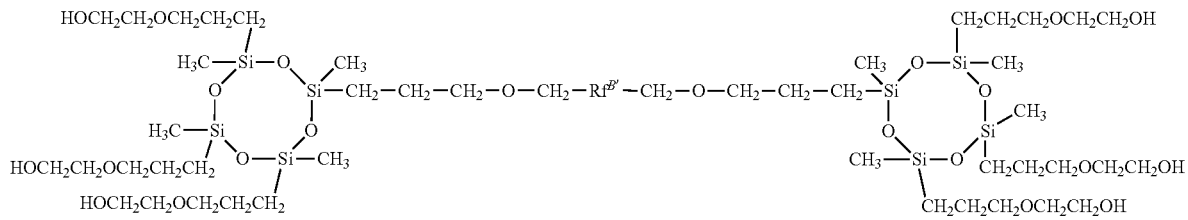

[Chem. 58]

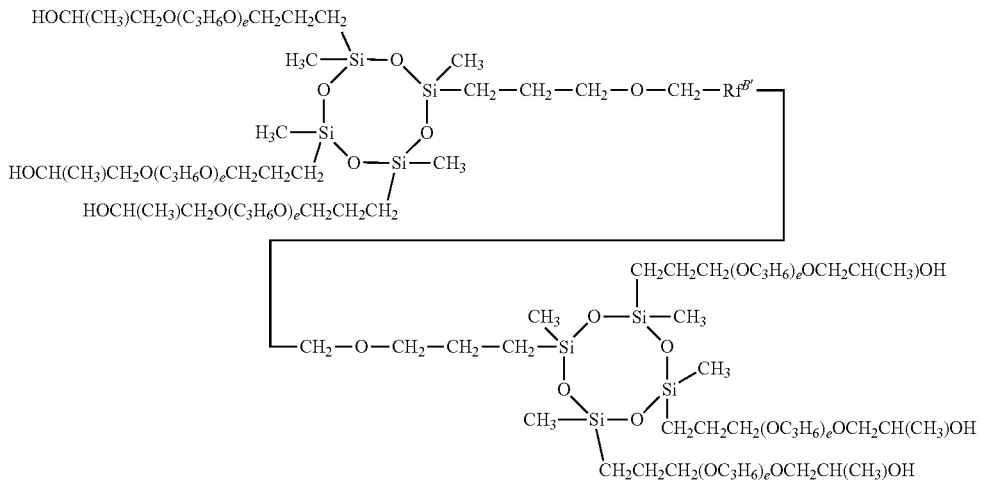

[Chem. 59]

-continued

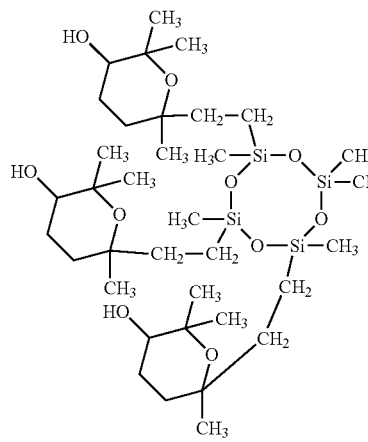 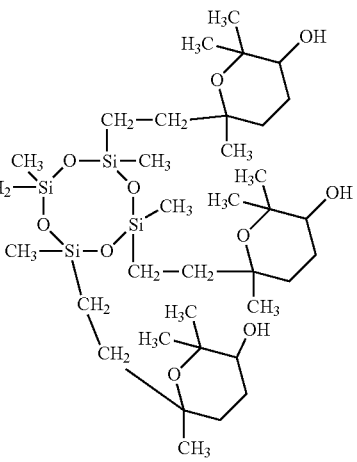

Herein $Rf^{B'}$ and e are as defined above.

Next, the fluorinated alcohol compound having formula (14) is converted to the target fluorinated acrylic compound by introducing a (meth)acryloyl group into the alcohol compound.

The method of introducing a (meth)acryloyl group into the fluorinated alcohol compound having formula (14) may be either one method of reacting the alcohol compound with a (meth)acrylic halide having the following formula (15) to form an ester or another method of reacting the alcohol compound with a (meth)acryloyl-containing isocyanate compound having the following formula (16). From these methods, the fluorinated acrylic compound having formula (2) is obtainable.

$$XC(=O)CR^3=CH_2 \quad (15)$$

$$O=C=N-CH_2CH_2OC(=O)CR^3=CH_2 \quad (16)$$

Herein $R^3$ and X are as defined above.

Examples of the (meth)acrylic halide having formula (15) are shown below.

$$XC(=O)CH=CH_2$$

$$XC(=O)C(CH_3)=CH_2$$

Herein X is as defined above.

Inter alia, acrylic chloride and methacrylic chloride are preferred.

Examples of the (meth)acryloyl-containing isocyanate compound having formula (16) are shown below.

$$O=C=N-CH_2CH_2OC(=O)CH=CH_2$$

$$O=C=N-CH_2CH_2OC(=O)C(CH_3)=CH_2$$

The (meth)acrylic halide or (meth)acryloyl-containing isocyanate compound may be charged for reaction in at least an equimolar amount to the total of hydroxy groups in the fluorinated alcohol compound so that all hydroxy groups are reacted. Since it suffices that at least 1 mole on the average of (meth)acryloyl groups are introduced per mole of the fluorinated alcohol compound, another setting is to keep hydroxy groups in excess so that the (meth)acrylic halide or (meth)acryloyl-containing isocyanate compound may not be left unreacted. Specifically, provided that the amount of the fluorinated alcohol compound in the reaction system is x moles and the total of hydroxy groups in the fluorinated alcohol compound is y moles, the amount of the (meth)acrylic halide or (meth)acryloyl-containing isocyanate compound is preferably from x moles to 2y moles, more preferably from 0.6y moles to 1.4y moles. If the amount is too small, there is a strong possibility that the fluorinated alcohol compound having no (meth)acryloyl groups introduced at all is left behind and the product has a low solubility. If the amount is too large, it is difficult to remove the unreacted or remaining (meth)acrylic halide or (meth)acryloyl-containing isocyanate compound.

The above reaction may be carried out, if desired, after the reaction mixture is diluted with a suitable solvent. The solvent used herein is not particularly limited as long as it is unreactive with the hydroxy group of the fluorinated alcohol compound, halogen atom of the (meth)acrylic halide, and isocyanate group of the (meth)acryloyl-containing isocyanate compound. Suitable solvents include hydrocarbon solvents such as toluene, xylene and isooctane, ether solvents such as tetrahydrofuran (THF), diisopropyl ether and dibutyl ether, ketone solvents such as acetone, methyl ethyl ketone, methyl butyl ketone, methyl isobutyl ketone, and cyclohexanone, fluorine-modified aromatic hydrocarbon solvents such as m-xylene hexafluoride and benzotrifluoride, and fluorine-modified ether solvents such as methyl perfluorobutyl ether. The solvent may be removed at the end of reaction by any well-known means such as vacuum distillation, although the diluted solution may be directly used depending on the intended application.

Although the amount of the solvent used is not particularly limited, the amount is preferably up to 10 times the total weight of reactants. If the amount of the solvent used is too large, there is a risk of noticeable deceleration of a reaction rate.

Upon the reaction, a polymerization inhibitor may be added if necessary. The polymerization inhibitor used herein is not particularly limited as long as it is commonly used for acrylic compounds. Examples include hydroquinone, hydroquinone monomethyl ether, 4-tert-butyl catechol, and dibutyl hydroxytoluene.

The amount of the polymerization inhibitor used is not particularly limited and may be determined in accordance with the reaction conditions, purifying conditions after the reaction, and final use conditions. Often, the amount is preferably 0.01 to 5,000 ppm, more preferably 0.1 to 500 ppm based on the total weight of reactants.

When the (meth)acrylic halide, preferably acrylic chloride or methacrylic chloride is reacted with the fluorinated alcohol compound to form an ester, this ester forming reaction is carried out by adding dropwise the (meth)acrylic halide while mixing and stirring the reaction intermediate (fluorinated alcohol compound) and an acid acceptor. The acid acceptor used herein is selected from triethylamine, pyridine, and urea. The amount of the acid acceptor used is desirably about 0.9 to 3 times the moles of the (meth)acrylic halide charged. If the amount is too small, more acid is left untrapped. If the amount is too large, it is difficult to remove the excess of acid acceptor.

The dropwise addition of the (meth)acrylic halide is performed over 20 to 60 minutes while maintaining the reaction mixture at a temperature of 0 to 35° C. Thereafter, stirring is continued for a further 30 minutes to 10 hours. At the end of reaction, the unreacted (meth)acrylic halide, the salt formed by the reaction, reaction solvent and the like are removed by such means as distillation, adsorption, filtration or washing whereupon the fluorinated acrylic compound having formula (2) is obtained.

After the reaction is stopped, an alcohol compound such as methanol or ethanol may be added to the reaction system to esterify the unreacted (meth)acrylic halide. The (meth)acrylate formed may be removed by the same means as the removal of the unreacted (meth)acrylic halide although the reaction product having the (meth)acrylate left therein may be used as such.

When the fluorinated alcohol compound is reacted with the (meth)acryloyl-containing isocyanate compound, the reactants are stirred along with the solvent, if any, for advancing the reaction.

In the reaction, a suitable catalyst may be added for accelerating the reaction rate. Examples of the catalyst include alkyl tin esters such as dibutyltin diacetate, dibutyltin dilaurate, dibutyltin dioctoate, dioctyltin diacetate, dioctyltin dilaurate, dioctyltin dioctate, stannous dioctanoate; titanic acid esters or titanium chelates such as tetraisopropoxytitanium, tetra-n-butoxytitanium, tetrakis(2-ethylhexoxy) titanium (also known as tetrakis(2-ethylhexyl) orthotitanate), dipropoxybis(acetylacetonato)titanium, titanium isopropoxyoctylene glycol; and zirconium chelates such as zirconium tetraacetylacetonate, zirconium tributoxymonoacetylacetonate, zirconium monobutoxyacetylacetonate bis(ethylacetoacetate), zirconium dibutoxybis(ethylacetoacetate), zirconium tetraacetylacetonate. These compounds may be used alone or in admixture of two or more. Preferably, titanium compounds and tin compounds are used because they have a low impact on the environment. The reaction rate can be increased by adding the catalyst in an amount of 0.01 to 2% by weight, more preferably 0.05 to 1% by weight based on the total weight of reactants.

The reaction is carried out at a temperature of 0 to 120° C., preferably 10 to 70° C., for 1 minute to 50 hours, preferably 10 minutes to 48 hours. If the reaction temperature is too low, the reaction rate may become too low. If the reaction temperature is too high, polymerization of (meth)acryloyl groups can take place as a side reaction.

After the completion of reaction, the fluorinated acrylic compound having formula (2) is obtained by removing the unreacted isocyanate compound and reaction solvent by such means as distillation, adsorption, filtration or washing.

Also, after the reaction is stopped, an alcohol compound such as methanol or ethanol may be added to the reaction system to form a urethane bond with the unreacted isocyanate compound. The resulting urethane (meth)acrylate may be removed by the same means as used for the unreacted isocyanate compound although the reaction mixture having the unreacted compound left therein may be used as such.

[Component (C)]

Component (C), which is a third essential component in the inventive curable fluorinated composition, is a non-fluorinated acrylic compound free of fluoropolyether structure and having on the average at least two (meth)acryloyl groups per molecule. Encompassed in component (C) are urethane (meth)acrylates having a urethane bond in the molecule and various polymers having two or more (meth)acryloyl groups introduced at side chains or ends thereof by any desired method.

The non-fluorinated acrylic compound (C) may be any of compounds having at least two (meth)acryloyl groups per molecule. Examples include di- to hexa-functional (meth)acrylic compounds such as 1,6-hexanediol di(meth)acrylate, neopentyl glycol di(meth)acrylate, ethylene glycol di(meth)acrylate, isocyanuric acid ethylene oxide-modified di(meth)acrylate, isocyanuric acid ethylene oxide-modified tri(meth)acrylate, trimethylolpropane tri(meth)acrylate, pentaerythritol tri(meth)acrylate, glycerol tri(meth)acrylate, tris(meth)acryloyloxyethyl phosphate, (2,2,2-tri(meth)acryloyloxymethyl)ethyl hydrogen phthalate, glycerol tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate, and sorbitol hexa(meth)acrylate, as well as the foregoing (meth)acrylic compounds modified with ethylene oxide, propylene oxide, epichlorohydrin, fatty acids, or alkyls, epoxy (meth)acrylates obtained by adding (meth)acrylic acid to epoxy resins, (meth)acrylate copolymers having (meth)acryloyl groups introduced at side chains.

Also, urethane (meth)acrylates, products obtained by reacting polyisocyanate with a (meth)acrylate having a hydroxy group, products obtained by reacting polyisocyanate and diol-terminated polyester with a (meth)acrylate having a hydroxy group, and products obtained by reacting polyisocyanate, which is obtained by reacting polyol with an excess of diisocyanate, with a (meth)acrylate having a hydroxy group. Inter alia, preference is given to urethane (meth)acrylates which are obtained by reacting a hydroxy-bearing (meth)acrylate selected from 2-hydroxyethyl (meth)acrylate, 2-hydroxy-3-acryloyloxypropyl (meth)acrylate, and pentaerythritol tri(meth)acrylate, with a polyisocyanate selected from hexamethylene diisocyanate, isophorone diisocyanate, tolylene diisocyanate, lysin diisocyanate, norbornane diisocyanate, 1,3-bis(isocyanatomethyl)cyclohexane, methylene bis(4-cyclohexyl isocyanate), 2-methyl-1,3-diisocyanatocyclohexane, 2-methyl-1,5-diisocyanatocyclohexane, and diphenylmethane diisocyanate.

Component (C) may be used alone whereas a mixture of plural compounds may be used for the purposes of enhancing ease of coating and properties of a cured film.

It is especially preferred to use a polyfunctional acrylic compound having at least two (meth)acryloyl groups per molecule, but free of a urethane bond, or a mixture of at least two acrylic compounds including said polyfunctional acrylic compound and a polyfunctional urethane (meth)acrylate having at least three (meth)acryloyl groups per molecule, which is obtained from reaction of an aliphatic polyisocyanate with a hydroxy-containing acrylic compound.

Examples of the polyfunctional acrylic compound having at least two (meth)acryloyl groups per molecule, but free of a urethane bond include trimethylolpropane tri(meth)acrylate, pentaerythritol tri(meth)acrylate, glycerol tri(meth)acrylate, pentaerythritol tetra(meth)acrylate, ditrimethylolpropane tetra(meth)acrylate, dipentaerythritol penta(meth) acrylate, dipentaerythritol hexa(meth)acrylate, sorbitol hexa (meth)acrylate, and the foregoing compounds modified with ethylene oxide or propylene oxide.

Examples of the polyfunctional urethane (meth)acrylate having at least three (meth)acryloyl groups per molecule, which is obtained from reaction of an aliphatic polyisocyanate with a hydroxy-containing acrylic compound include products which are obtained from reaction of a di- or polyfunctional polyisocyanate (obtained by reacting any one of hexamethylene diisocyanate, norbornane diisocyanate, isophorone diisocyanate, and trimers thereof, and di- and trifunctional isocyanates thereof, with an aliphatic diol or aliphatic polyol), with a (meth)acrylate selected from a poly(meth)acrylate having a hydroxy group on a side chain, trimethylolpropane di(meth)acrylate, glycerin di(meth)acrylate, bis(2-(meth)acryloyloxyethyl)hydroxyethyl isocyanurate, pentaerythritol tri(meth)acrylate, ditrimethylolpropane tri(meth)acrylate, dipentaerythritol penta(meth)acrylate, and the foregoing compounds modified with ethylene oxide or propylene oxide; and products which are obtained from reaction of an aliphatic polyol, a poly(meth)acrylate having a hydroxy group on a side chain, and an acrylic compound having an isocyanate group such as 2-isocyanatoethyl (meth)acrylate or 1,1-bis(acryloyloxymethyl)ethyl isocyanate.

Component (C) may include not only a liquid component, but also a polymer or inorganic filler in microparticulate form which is modified on their surface with (meth)acryloyl groups.

In the curable fluorinated composition of the invention, the components are desirably present in such ratios that the total weight of components (A) and (B) is 0.05 to 50 parts by weight, more preferably 0.1 to 10 parts by weight per 100 parts by weight of component (C), and the amount of component (A) is 1 to 100 parts by weight, more preferably 3 to 50 parts by weight per 100 parts by weight of component (B). If the total of components (A) and (B) is too large relative to component (C), the performance as a hard coat film degrades. If the total of components (A) and (B) is too small, no satisfactory antifouling performance is exerted. If the amount of component (A) is too large relative to component (B), the solubility in component (C) is aggravated, with the risk of generating coating defects. If the amount of component (A) is too small, a difference from the single use of component (B) ceases to develop.

The curable fluorinated composition essentially contains the above-mentioned three components (A), (B) and (C). The composition having only these components blended can be cured with heat, electron beam or the like. Depending on working and other aspects, any components other than the three components may be added to the composition, if necessary.

In particular, a curable composition which is more curable on use of UV as the actinic energy ray can be formulated by adding a photopolymerization initiator as component (D).
[Component (D)]

Component (D) is a photopolymerization initiator which is not particularly limited as long as it helps an acrylic compound cure upon UV irradiation. Preferred examples include acetophenone, benzophenone, 2,2-dimethoxy-1,2-diphenylethan-1-one, 1-hydroxycyclohexyl phenyl ketone, 2-hydroxy-2-methyl-1-phenyl-propan-1-one, 1-[4-(2-hydroxyethoxy)phenyl]-2-hydroxy-2-methyl-1-propan-1-one, 2-methyl-1-(4-methylthiophenyl)-2-morpholinopropan-1-one, 2-benzyl-2-dimethylamino-1-(4-morpholinophenyl)butan-1-one, 2-(dimethylamino)-2-[(4-methylphenyl)methyl]-1-[4-(4-morpholinyl)phenyl]-1-butanone, (2,4,6-trimethylbenzoyl)diphenylphosphine oxide, bis(2,4,6-trimethylbenzoyl)phenylphosphine oxide, 1,2-octanedione-1-[4-(phenylthio)-2-(O-benzoyloxime)], ethanone-1-[9-ethyl-6-(2-methylbenzoyl)-9H-carbazol-3-yl]-1-(0-acetyloxime), and 2-hydroxy-1-{4-[4-(2-hydroxy-2-methylpropionyl)benzyl]phenyl}-2-methyl-propan-1-one, which may be used alone or in admixture.

The amount of component (D) added may be determined as appropriate depending on the curing conditions and the desired physical properties of the composition. For example, the desired amount is 0.1 to 15 parts by weight, especially 1 to 10 parts by weight per 100 parts by weight of component (C). An amount less than the range may negatively affect curability whereas an amount larger than the range may have a noticeable impact on cured physical properties.

As components (A), (B), (C), and (D), a single compound or a mixture of plural compounds whose structure falls within the definition of each compound may be used. On use of a mixture of plural compounds, the amount of a component blended is given by the total weight of the compounds.

Depending on a particular purpose, the curable fluorinated composition of the invention may further comprise reaction diluents (e.g., monofunctional acrylic compounds), thiol compounds and maleimide compounds), actinic energy ray-reactive compounds other than (meth)acryloyl groups, organic solvents, polymerization inhibitors, antistatic agents, defoamers, viscosity regulators, photo-stabilizers, thermal stabilizers, antioxidants, surfactants, coloring agents, and polymeric or inorganic fillers.

Examples of the organic solvent include alcohols such as 1-propanol, 2-propanol, isopropyl alcohol, n-butanol, isobutanol, tert-butanol, and diacetone alcohol; ketones such as methyl propyl ketone, diethyl ketone, methyl ethyl ketone, methyl isobutyl ketone, and cyclohexanone; ethers such as dipropyl ether, dibutyl ether, anisole, dioxane, ethylene glycol monoethyl ether, ethylene glycol monobutyl ether, propylene glycol monomethyl ether, propylene glycol monomethyl ether acetate; esters such as propyl acetate, butyl acetate and cyclohexyl acetate; and aromatic solvents such as toluene, xylene, triethylbenzene and alkylbenzenes, which may be used alone or in admixture.

Although the amount of the solvent used is not particularly limited, the preferred amount is 20 to 10,000 parts by weight, more preferably 100 to 1,000 parts by weight per 100 parts by weight of components (A) to (C) combined.

Also, the polymerization inhibitors, antistatic agents, defoamers, viscosity regulators, photo-stabilizers, thermal stabilizers, antioxidants, surfactants, coloring agents, and fillers are not particularly limited. Any of well-known agents may be used as long as the objects of the invention are not compromised.

Furthermore, by-products formed during and residual unreacted reactants left after the preparation of components (A) and (B) may be present in the composition as long as the objects and benefits of the invention are not compromised. Such ingredients are given, for example, when the fluorinated alcohol compounds having formulae (7) and (14) are left unreacted.

It is noted that a variety of hard coat agents having component (C) and various additives blended therein are commercially available from manufacturers. The curable fluorinated composition of the invention may be obtained by adding components (A) and (B) to such commercial agents. Commercial hard coat agents include, for example, Beamset (Arakawa Chemical Industries, Ltd.), Yubic (Ohashi Chemical Industries, Ltd.), UV coat (Origin Co., Ltd.), Cashew (Cashew Co., Ltd.), Desolite (JSR Corp.), Seikabeam (Dainichiseika Color & Chemicals Mfg. Co., Ltd.), Nichigo-UV (JSR Corp.), Fujihard (Fujikura Kasei Co., Ltd.), Diabeam (Mitsubishi Chemical Corp.), and Ultra-vin (Musashi Paint Co., Ltd.).

Even when commercial hard coat agents are used as mentioned above, any of organic solvents, polymerization inhibitors, antistatic agents, defoamers, viscosity regulators, photo-stabilizers, thermal stabilizers, antioxidants, surfactants, coloring agents, and fillers may be additionally blended.

With respect to components (C) and (D) and optional additives which can be blended herein, reference may be made to many well-known documents, for example, Technonet Ed., "Photocuring Technology Data Book—Material—" (2000, Technonet K.K.), Photopolymer Associate Ed., "Photopolymer Handbook" (1989, Kogyo Chousakai Publishing Co., Ltd.), Comprehensive Technology Center Ed., "UV-EB Curing Technology" (1982, Comprehensive Technology Center), Rad-Tech Research Ed., "UV-EB Curing Material" (1992, CMC), Technical Information Institute Ed., "Cure Fault and Inhibition Factors in UV Curing and Countermeasure" (2003, Technical Information Institute), Technical Information Institute Ed., "Formulation of UV Cure Resins, Property Evaluation and New Application" (2017, Technical Information Institute), CMC Publisher Ed., "Current and Future Markets of UV-EB Cure Materials and Products" (2007, CMC Publisher), and Science & Technology Ed., "Optimization of UV Cure Process" (2008, Science & Technology), which may be utilized in an arbitrary combination.

The method of formulating the curable fluorinated composition of the invention is not particularly limited. Any desired method may be employed depending on a particular application. It is desired that components (A) and (B) be intimately mixed prior to mixing with other components. For example, in one preferred procedure, components (A) and (B) are mixed in a necessary ratio, optionally diluted with a solvent, then mixed with component (C) and other components. In another preferred procedure, component (A) diluted with a solvent and component (B) diluted with a solvent are mixed and then mixed with component (C) and other components.

The method of curing the curable fluorinated composition is not particularly limited. The composition containing components (A), (B) and (C) is diluted with a solvent and applied to form a coating, which may be cured by heat or actinic energy rays such as electron beam. When the composition further contains a photopolymerization initiator as component (D), it can be cured with UV radiation. In the case of UV cure, although UV irradiation in air is acceptable, it is preferable, for preventing oxygen inhibition of cure, to carry out cure at an oxygen concentration reduced below 5,000 ppm, especially in an inert gas atmosphere such as nitrogen, carbon dioxide or argon.

With respect to the general form of use of the curable fluorinated composition, the curable fluorinated composition can be applied to any substrate as long as a cured layer of the composition tightly bonds or adheres thereto. Preferred are substrates of resins, for example, polyethylene terephthalate, polybutylene terephthalate, polyethylene naphthalate, polyethylene, polypropylene, cellophane, diacetyl cellulose, triacetyl cellulose, acetyl cellulose butyrate, cellulose acetate propionate, cycloolefin polymers, cycloolefin copolymers, polyvinyl chloride, polyvinylidene chloride, polyvinyl alcohol, ethylene-vinyl acetate copolymers, polystyrene, polycarbonate, polymethyl pentene, polysulfone, polyether ether ketone, polyether sulfone, polyether imide, polyimide, fluoro-resins, nylon, and acrylic resins. The composition is applicable to the surface of a substrate made of the resin in the form of a film, plate, molded part or the like.

Also included is a structure in which the curable fluorinated composition is coated onto one surface of a film substrate and a pressure-sensitive adhesive is applied to the opposite surface of the substrate. Further, a parting film may be disposed thereon for protecting the pressure-sensitive adhesive.

While the film substrate may be a substrate consisting of a resin film as mentioned above, it may also take the form of a film substrate obtained by applying a primer layer on a resin film for improving the adhesion to the curable fluorinated composition. The primer layer is made of, for example, polyester resins, urethane resins, or acrylic resins.

Also, the curable fluorinated composition of the invention may be coated and cured on a layer of a curable composition falling outside the scope of the invention independent of whether or not the latter composition has been cured. For example, a layer of a cured product having higher hardness, durability, antistatic and deformation resistant (e.g., anti-curling) properties may be overlaid with the curable fluorinated composition.

For the purpose of improving adhesion to the curable fluorinated composition, the surface of the resin film may have been subjected to a suitable treatment, for example, surface roughening treatments such as sand blasting and solvent treatment, as well as corona discharge treatment, chromic acid treatment, flame treatment, hot air treatment, ozone/UV irradiation treatment, and oxidation treatment.

The method of applying the curable fluorinated composition of the invention to the substrate or article is not particularly limited. Any well-known coating methods may be used, for example, roll coating, gravure coating, flow coating, curtain coating, dip coating, spray coating, spin coating, bar coating, and screen printing.

At the end of coating, actinic energy ray is irradiated to the coating for curing. The actinic energy ray may be any of electron beam, UV and other radiation, with UV being preferred. As the UV source, mercury lamps, metal halide lamps, and LED lamps are preferred. The dose of UV radiation is desirably in a range of 10 to 10,000 $mJ/cm^2$, more desirably 100 to 4,000 $mJ/cm^2$ for the reason that if the dose is too small, uncured components are left, and if excessive, the coating and the substrate can be degraded.

Also, suitable means may be taken for preventing oxygen inhibition of cure, for example, the atmosphere for UV irradiation may be purged with an oxygen molecule-free inert gas such as nitrogen, carbon dioxide or argon; the coating surface may be covered with a UV-transmissive protective layer having parting properties, and UV be irradiated from above the protective layer; when the substrate is UV-transmissive, the coating surface may be covered with a protective layer having parting properties and UV be irradiated from the side of the substrate opposite to the coating side. Also for the purpose of levelling the coating or promoting polymerization of (meth)acryloyl groups in the coating, the coating and the substrate may be heated by any suitable means such as IR or a hot air drying furnace prior to or during the UV irradiation.

The cured layer of the curable fluorinated composition thus obtained has a thickness of preferably 0.01 to 5,000 m, more preferably 0.05 to 200 m, though not critical.

The cured layer of the curable fluorinated composition thus obtained preferably presents a water/oil repellent surface as demonstrated by a static contact angle with water of at least 100°, especially at least 105°, expressed by an angle included between a solid surface and the surface of a 2-µL droplet of deionized water after 1 second from contact, and a static contact angle with oleic acid of at least 60°, especially at least 65°, expressed by an angle included between a solid surface and the surface of a 4-µL droplet of oleic acid after 1 second from contact. In order that the contact angles fall in the specific ranges, the cured layer of the curable fluorinated composition is preferably in such a buildup that the layer has an average thickness of at least 10 nm over the entire surface area of the cured layer. It is also preferable that no unreacted (meth)acryloyl groups be left on the surface of the cured layer. In this sense, the cured layer which has been cured in an inert gas atmosphere such as nitrogen or carbon dioxide is desirable.

As mentioned above, the curable fluorinated composition of the invention can be cured with actinic energy ray such as UV, to form a cured resin layer on the surface of an article, the cured resin layer having excellent water/oil repellent, antifouling, slipping, and abrasion resistant properties.

The invention further provides an article comprising a cured film which is obtained by coating the curable fluorinated composition of the invention onto the surface of a substrate and curing the coating. As mentioned above, using the curable fluorinated composition, a cured film (cured resin layer) having excellent surface properties can be formed on the surface of the substrate (article). The curable fluorinated composition is useful especially for imparting water repellent, oil repellent and antifouling properties to the surface of an acrylic hard coat. The substrate is thus endowed with a hard coat surface which is resistant to deposition of human fats such as fingerprints, sebum and perspiration, stains of cosmetics or the like, machine oils and the like, and is easy to wipe off. Therefore, the curable fluorinated composition provides an antifouling coating film or protective film to the surface of substrates (or articles) which can be stained with human fats, cosmetics or the like by human contacts, or the surface of process material films set in machine interiors which can be stained with workers fats and machine oils.

The cured film (cured resin layer) of the inventive curable fluorinated composition is useful as a coating film or surface protective film on casings of various instruments including portable information (communication) terminals (e.g., computer tablets, laptop computers, mobile phones, smartphones), digital media players, electronic book readers; the surface of display devices, typically the screen of flat panel displays and TVs, for example, watch or eyeglass type wearable computers, head mount displays, liquid crystal displays, plasma displays, organic electroluminescence (EL) displays, rear projection displays, vacuum fluorescent displays (VFD), field emission projection displays, CRT, toner displays, quantum dot (QD) displays as well as various optical films used in their interior; automobile exteriors, luster surfaces of pianos and furniture, surfaces of building stones like marble, decorative building materials in wet areas (e.g., toilets, baths, washbowls), protective glass for art work display, show windows, show cases, photo-frame covers, watches, cosmetic containers, decorative containers, window glass in automobiles, trains and aircraft, automobile headlamps and taillamps, members of transparent glass or transparent plastics (e.g., acrylic resins, polycarbonate), covers of car mount sensors (e.g., EHF radar), and various mirror members.

Among others, the cured film is useful as a surface protective film on various instruments including display input units (e.g., tough panel displays) whose screen is manipulated with human finger or palm, for example, computer tablets, laptop computers, smartphones, mobile phones, other portable information (communication) terminals, smart watches, digital media players, electronic book readers, digital photo-frames, game consoles, digital cameras, digital video cameras, GPS display/record instruments, automobile navigation systems, automobile control panels, automatic teller machines, vending machines, digital signages, security system terminals, POS terminals, controllers (e.g., remote controllers), and display input units (e.g., car mount panel switches).

The cured film of the inventive curable fluorinated composition is also useful as a surface protective film on optical parts and optical devices including optical recording media such as opto-magnetic disks and optical disks, eyeglass lenses, prisms, lens sheets, pellicle films, polarizers, optical filters, lenticular lenses, Fresnel lenses, antireflective films, camera lenses, lens protective filters, optical fibers, and photo-couplers.

The curable fluorinated composition ensures that the fluoropolyether structures of the compounds as components (A) and (B) are disposed on the surface of the selected article, thereby imparting thereto excellent properties such as water repellency, oil repellency, slipping, antifouling, fingerprint-covering, fingerprint-wiping properties, abrasion resistance, low refractive index, solvent resistance, and chemical resistance.

On use of the curable fluorinated composition, any appropriate use method may be selected depending on the importance of a component combination, compositional ratio, or properties, and on the basis of the well-known technique for a particular application. The well-known technique to be considered encompasses not only the techniques relating to fluorinated compositions, but also the techniques used for the existing actinic energy ray-curable compositions.

For example, when the curable fluorinated composition is prepared by blending components (A) and (B) and combining various components in the composition, it will readily occur to those artisans from the findings relating to well-known curable acrylic compositions that reactive hollow silica or reactive group-free hollow silica, or a non-fluorinated polyfunctional acrylic compound having a functionality of at least 3 is used as component (C) when a low refractive index and low reflection properties utilizing the same are considered important; that an appropriate amount of at least two non-fluorinated polyfunctional acrylic compounds is blended as component (C) when it is desired to improve film strength or mar resistance; and that a combination of a non-fluorinated polyfunctional acrylic compound having a functionality of at least 6 and a non-fluorinated acrylic compound having a functionality of up to 3 is used as component (C) for establishing a balance between hardness and flexibility.

Also, when an article is obtained by coating the curable fluorinated composition, adjustment is carried out so as to gain an appropriate coating thickness to prevent interference fringes when the composition is coated onto a film substrate; or the thickness of a film substrate is adjusted to facilitate curl prevention; or the modulus of elasticity of a film substrate is adjusted to prevent a cured film of the curable fluorinated composition from deformation or fissure. Any of these adjustments may be selected by carrying out screening operations based on various combinations of the existing conditions corresponding to the properties and readily achieved by a combination of the invention with the existing technology.

EXAMPLES

Synthesis Examples, Examples, and Comparative Examples are shown below for illustrating the invention although the invention is not limited thereto.

[Synthesis Example 1] Synthesis of Fluorinated Acrylic Compound A-1

A 300-mL four-necked flask equipped with a reflux condenser and a stirrer was charged with 100 g (Si—H groups 0.0737 mol) of a compound whose average structure has the formula (I):

[Chem. 60]

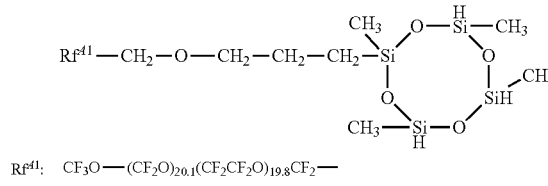

$Rf^{41}$: $CF_3O$—$(CF_2O)_{20.1}(CF_2CF_2O)_{19.8}CF_2$— wherein repeat units: —$CF_2CF_2O$— and —$CF_2O$— are randomly arranged, 12.0 g (0.0811 mol) of a compound having the formula (II):

$$CH_2=CH_2Si(OCH_3)_3 \qquad (II)$$

and 200 g of m-xylene hexafluoride, which were heated at 90° C. while stirring in dry air atmosphere. To the flask, 0.0884 g (containing $2.2 \times 10^{-7}$ mol of elemental Pt) of a toluene solution of platinum/1,3-divinyl-tetramethyldisiloxane complex was admitted and heating and stirring was continued for 4 hours and stopped. An analysis of the reaction solution by $^1$H-NMR and IR spectroscopy confirmed that the peaks assigned to Si—H group disappeared. The reaction solution was distilled in vacuum, obtaining 101.1 g of a compound having the following structure (III).

[Chem. 61]

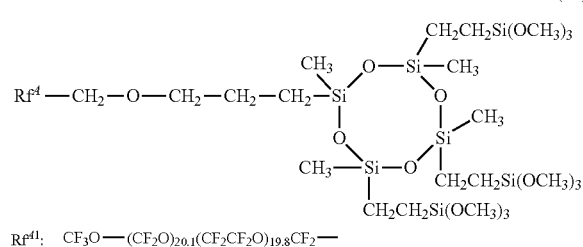

$Rf^{41}$: $CF_3O$—$(CF_2O)_{20.1}(CF_2CF_2O)_{19.8}CF_2$—

A 100-mL three-necked flask equipped with a reflux condenser and a stirrer was charged with 20 g (—Si—$OCH_3$ group 0.0398 mol) of Compound (III), 6.74 g (0.0421 mol) of a compound having the formula (IV):

$$CH_2=CHC(=O)OCH_2Si(CH_3)_2OH \qquad (IV)$$

and 40 g of m-xylene hexafluoride, which were stirred at 40° C. in nitrogen atmosphere. To the flask, 0.2 g of 10 wt % m-xylene hexafluoride solution of titanium tetra-2-ethylhexoxide was added, after which stirring was continued for 4 hours. The reaction solution was cooled to room temperature (25° C., the same holds true, hereinafter), and poured into 500 mL of isopropanol. The mixture was stirred for 1 hour and allowed to stand for 24 hours. The resulting precipitate was dissolved in 50 g of acetone, which was passed through an evaporator at 50° C./267 Pa for 1 hour to distill off the acetone, yielding 23.4 g of a white paste material. On $^1$H-NMR and IR analyses, it was identified to be a fluorinated acrylic compound A-1 shown below.

[Chem. 62]

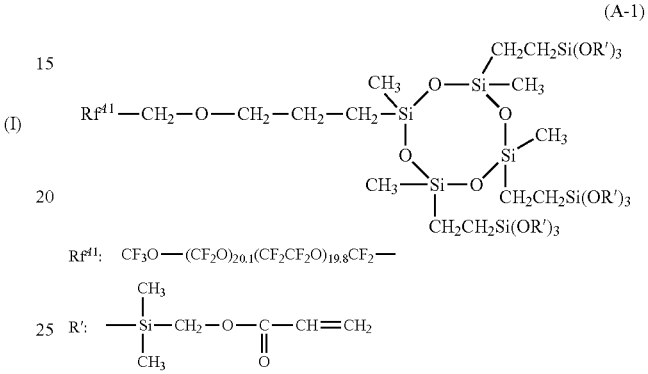

$Rf^{41}$: $CF_3O$—$(CF_2O)_{20.1}(CF_2CF_2O)_{19.8}CF_2$—

[Synthesis Example 2] Synthesis of Fluorinated Acrylic Compound A-2

In dry air atmosphere, 100.0 g (Si—H group 0.0737 mol) of Compound (I) used in Synthesis Example 1 was mixed with 8.06 g (0.0789 mol) of 2-allyloxyethanol, 50.0 g of m-xylene hexafluoride, and 0.0442 g (containing $1.1 \times 10^{-7}$ mol of elemental Pt) of a toluene solution of chloroplatinic acid/vinylsiloxane complex. The mixture was stirred at 100° C. for 4 hours. After the loss of Si—H group was confirmed by $^1$H-NMR and IR analyses, the solvent and the excess 2-allyloxyethanol were distilled off in vacuum. The subsequent active carbon treatment yielded 53.6 g of a fluorinated alcohol compound having the following formula (V) in colorless transparent liquid form.

[Chem. 63]

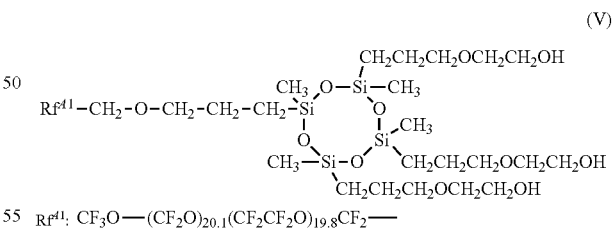

$Rf^{41}$: $CF_3O$—$(CF_2O)_{20.1}(CF_2CF_2O)_{19.8}CF_2$—

In dry air atmosphere, 50.0 g (hydroxy content 0.0343 mol) of fluorinated alcohol compound (V) was mixed with 50.0 g of THF and 4.93 g (0.0349 mol) of acryloyloxyethyl isocyanate, which was heated at 50° C. To the mixture, 0.15 g of tetrakis(2-ethylhexyl) orthotitanate was added, which was stirred at 50° C. for 24 hours. The heating was followed by vacuum distillation at 80° C./0.266 kPa, yielding 52.0 g of a slightly white turbid, liquid, highly viscous material. On 1H-NMR and IR analyses, it was identified to be a fluorinated acrylic compound A-2 shown below.

[Chem. 64]

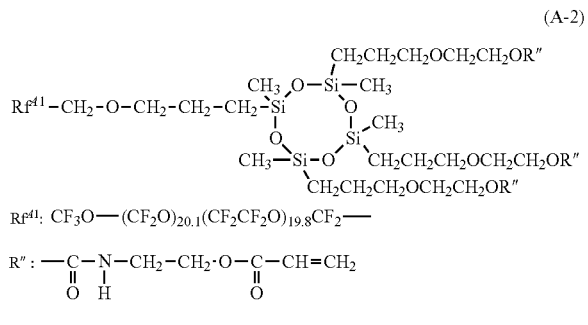

Rf[41]: $CF_3O-(CF_2O)_{20.1}(CF_2CF_2O)_{19.8}CF_2-$

R″: $-\underset{\underset{O}{\|}}{C}-\underset{\underset{H}{\|}}{N}-CH_2-CH_2\cdot O-\underset{\underset{O}{\|}}{C}-CH=CH_2$

[Synthesis Example 3] Synthesis of Fluorinated Acrylic Compound B-1

In dry nitrogen atmosphere, a 5,000-mL three-necked flask equipped with a reflux condenser and stirrer was charged with 1,000 g (0.245 mol) of a perfluoropolyether of the following formula:

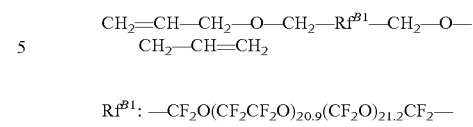

Rf[B1]: $-CF_2O(CF_2CF_2O)_{20.9}(CF_2O)_{21.2}CF_2-$ and 1,400 g of m-xylene hexafluoride, and 722 g (3.00 mol) of tetramethylcyclotetrasiloxane, which was heated at 90° C. while stirring. To the flask, 0.884 g (containing $2.2\times10^{-6}$ mol of elemental Pt) of a toluene solution of platinum/1,3-divinyl-tetramethyldisiloxane complex was admitted. Stirring was continued for 4 hours while maintaining the internal temperature above 90° C. After the loss of allyl group in the reactant was confirmed by $^1$H-NMR analysis, the solvent and the excess tetramethylcyclotetrasiloxane were distilled off in vacuum. The subsequent active carbon treatment yielded 993 g of a compound having the following formula (VI) in colorless transparent liquid form.

[Chem. 65]

(VI)

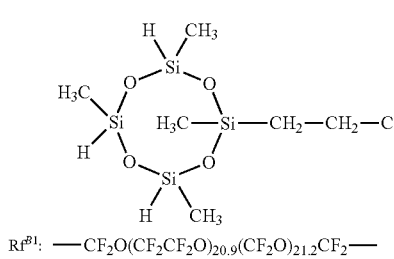 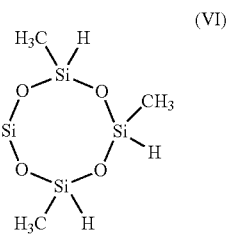

Rf[B1]: $-CF_2O(CF_2CF_2O)_{20.9}(CF_2O)_{21.2}CF_2-$

In dry air atmosphere, 50.0 g (SiH content 0.0657 mol) of Compound (VI) was mixed with 7.05 g (0.0690 mol) of 2-allyloxyethanol, 50.0 g of m-xylene hexafluoride, and 0.0442 g (containing $1.1\times10^{-7}$ mol of elemental Pt) of a toluene solution of chloroplatinic acid/vinylsiloxane complex. The mixture was stirred at 100° C. for 4 hours. After the loss of Si—H group was confirmed by $^1$H-NMR and IR analyses, the solvent and the excess 2-allyloxyethanol were distilled off in vacuum. The subsequent active carbon treatment yielded 54.9 g of a fluorinated alcohol compound having the following formula (VII) in pale yellow transparent liquid form.

[Chem. 66]

(VII)

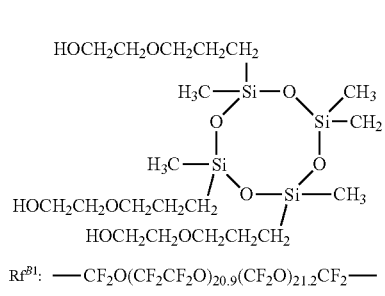 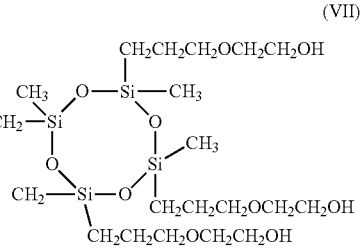

Rf[B1]: $-CF_2O(CF_2CF_2O)_{20.9}(CF_2O)_{21.2}CF_2-$

In dry air atmosphere, 50.0 g (hydroxy content 0.058 mol) of fluorinated alcohol compound (VII) was mixed with 50.0 g of THF and 9.00 g (0.0638 mol) of acryloyloxyethyl isocyanate, which was heated at 50° C. To the mixture, 0.15 g of tetrakis(2-ethylhexyl) orthotitanate was added, which was stirred at 50° C. for 24 hours. The heating was followed by vacuum distillation at 80° C./0.266 kPa, yielding 58.5 g of a pale yellow paste material. On $^1$H-NMR and IR analyses, it was identified to be a fluorinated acrylic compound B-1 shown below.

[Chem. 67]

(B-1)

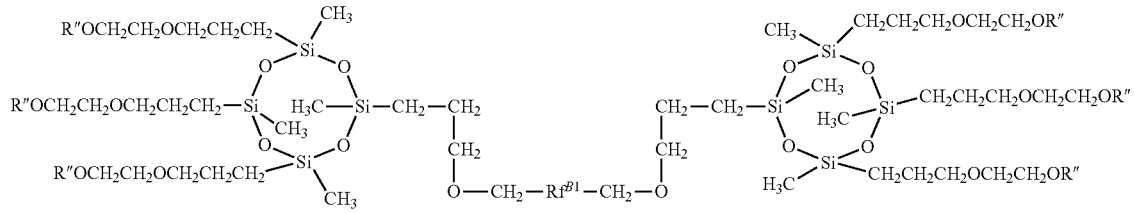

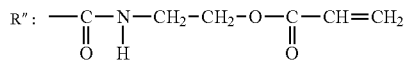

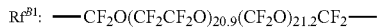

[Synthesis Example 4] Synthesis of Fluorinated Acrylic Compound B-2

In dry nitrogen atmosphere, a 500-mL three-necked flask equipped with a reflux condenser and stirrer was charged with 100 g (0.0501 mol) of a perfluoropolyether of the following formula:

$CH_2$=CH—$CH_2$—O—$CH_2$—$Rf^2$—$CH_2$—O—$CH_2$—CH=$CH_2$

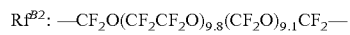

100 g of m-xylene hexafluoride, and 121 g (0.502 mol) of tetramethylcyclotetrasiloxane, which was heated at 90° C. while stirring. To the flask, 0.442 g (containing 1.1×10$^{-6}$ mol of elemental Pt) of a toluene solution of platinum/1,3-divinyl-tetramethyldisiloxane complex was admitted. Stirring was continued for 4 hours while maintaining the internal temperature above 90° C. After the loss of allyl group in the reactant was confirmed by $^1$H-NMR analysis, the solvent and the excess tetramethylcyclotetrasiloxane were distilled off in vacuum. The subsequent active carbon treatment yielded 112 g of a compound having the following formula (VIII) in colorless transparent liquid form.

[Chem. 68]

(VIII)

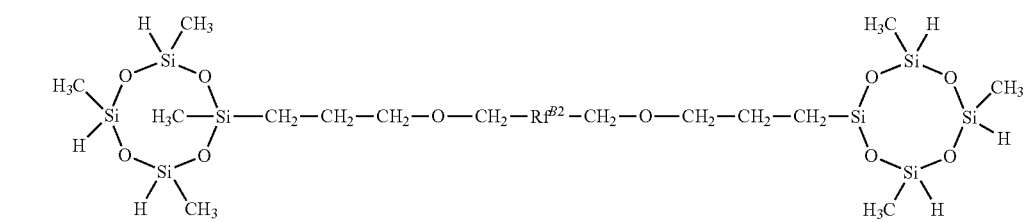

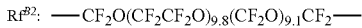

In dry air atmosphere, 50.0 g (SiH content 0.121 mol) of Compound (VIII) was mixed with 15.1 g (0.149 mol) of 2-allyloxyethanol, 100.0 g of m-xylene hexafluoride, and 0.0884 g (containing 2.2×10⁻⁷ mol of elemental Pt) of a toluene solution of chloroplatinic acid/vinylsiloxane complex. The mixture was stirred at 100° C. for 4 hours. After the loss of Si—H group was confirmed by $^1$H-NMR and IR analyses, the solvent and the excess 2-allyloxyethanol were distilled off in vacuum. The subsequent active carbon treatment yielded 60.2 g of a fluorinated alcohol compound having the following formula (IX) in pale yellow transparent liquid form.

[Chem. 69]

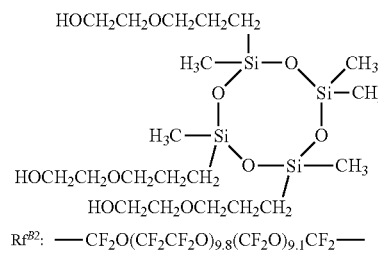
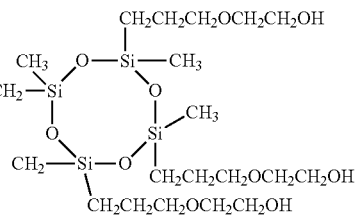

(IX)

In dry air atmosphere, 50.0 g (hydroxy content 0.097 mol) of fluorinated alcohol compound (IX) was mixed with 50.0 g of THF and 17.7 g (0.125 mol) of acryloyloxyethyl isocyanate, which was heated at 50° C. To the mixture, 0.05 g of dioctyltin dilaurate was added, which was stirred at 50° C. for 24 hours. The heating was followed by vacuum distillation at 80° C./0.266 kPa, yielding 63.5 g of a pale yellow highly viscous liquid. On $^1$H-NMR and IR analyses, it was identified to be a fluorinated acrylic compound B-2 shown below.

[Chem. 70]

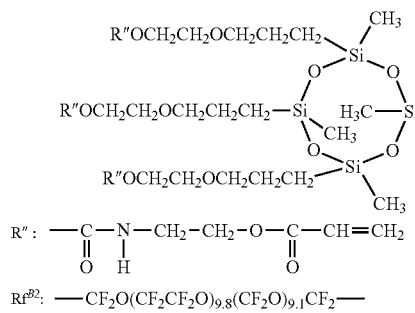
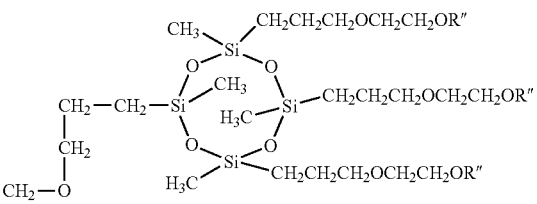

(B-2)

Examples 1 to 9 and Comparative Examples 1 to 6

The starting components used in formulating curable fluorinated compositions within the scope of the invention are shown below.

(A) Fluorinated acrylic compound
(A-1) Fluorinated acrylic compound obtained in Synthesis Example 1
(A-2) Fluorinated acrylic compound obtained in Synthesis Example 2

(B) Fluorinated acrylic compound
(B-1) Fluorinated acrylic compound obtained in Synthesis Example 3
(B-2) Fluorinated acrylic compound obtained in Synthesis Example 4

(C) Non-fluorinated acrylic compound
(C-1) pentaerythritol ethoxytetraacrylate (EBECRYL 40 by Daicel Allnex Ltd.)
(C-2) pentaerythritol triacrylate
(C-3) polyfunctional acrylate in the form of the reaction product of pentaerythritol triacrylate with hexamethylene diisocyanate (UA-306H by Kyoeisha Chemical Co., Ltd.)

(D) Photopolymerization initiator
(D-1) 1-hydroxycyclohexyl phenyl ketone (trade name IRGACURE 184 by BASF Japan Co., Ltd.)
(D-2) 2-hydroxy-1-{4-[4-(2-hydroxy-2-methylpropionyl)benzyl]phenyl}-2-methylpropan-1-one (trade name IRGACURE 127 by BASF Japan Co., Ltd.)

[Preparation of Curable Fluorinated Composition]

Components (A) and (B) were diluted with methyl ethyl ketone in a concentration of 20 wt %. Component (C) was diluted with butyl acetate in a concentration of 40 wt %. Notably, (C-4) corresponds to (C-1) diluted with 2-propanol instead of butyl acetate in a concentration of 40 wt %.

Curable fluorinated compositions were obtained by blending components (A) to (D) in blending ratios (expressed as neat components with the solvent removed) in Table 1.
Blending ratio of components (A) to (D) (exclusive of solvent) in Examples and Comparative Examples 2) Measurement of Contact Angle with Oleic Acid Using a contact angle meter (DropMaster by Kyowa Interface Science Co., Ltd.), a 4-µL droplet of oleic acid was dropped onto a cured film and a contact angle with oleic acid was measured after 1 second. The measurement is an average of 5 samples. The results are shown in Table 2.

TABLE 1

|  | (A) | Blending amount of (A) (pbw) | (B) | Blending amount of (B) (pbw) | (C) | Blending amount of (C) (pbw) | (D) | Blending amount of (D) (pbw) |
|---|---|---|---|---|---|---|---|---|
| Example 1 | (A-1) | 0.1 | (B-1) | 0.9 | (C-1) | 99 | (D-1) | 3 |
| Example 2 | (A-1) | 0.05 | (B-1) | 0.95 | (C-1) | 99 | (D-1) | 3 |
| Example 3 | (A-1) | 0.3 | (B-1) | 0.7 | (C-2) | 99 | (D-1) | 3 |
| Example 4 | (A-1) | 0.1 | (B-1) | 0.9 | (C-4) | 99 | (D-1) | 3 |
| Example 5 | (A-1) | 0.1 | (B-2) | 0.9 | (C-2) | 99 | (D-1) | 3 |
| Example 6 | (A-2) | 0.05 | (B-2) | 0.95 | (C-4) | 99 | (D-1) | 3 |
| Example 7 | (A-2) | 0.2 | (B-1) | 0.8 | (C-1) | 99 | (D-2) | 3 |
| Example 8 | (A-1) | 0.2 | (B-1) | 0.8 | (C-2) | 79 | (D-2) | 3 |
|  |  |  |  |  | (C-3) | 20 |  |  |
| Example 9 | (A-2) | 0.1 | (B-1) | 0.9 | (C-1) | 49 | (D-2) | 3 |
|  |  |  |  |  | (C-3) | 50 |  |  |
| Comparative Example 1 | (A-1) | 0.1 |  |  | (C-1) | 99.9 | (D-1) | 3 |
| Comparative Example 2 | (A-2) | 0.05 |  |  | (C-4) | 99.95 | (D-2) | 3 |
| Comparative Example 3 |  |  | (B-1) | 0.9 | (C-1) | 99.1 | (D-1) | 3 |
| Comparative Example 4 |  |  | (B-2) | 0.9 | (C-2) | 99.1 | (D-1) | 3 |
| Comparative Example 5 |  |  |  |  | (C-1) | 100 | (D-1) | 3 |
| Comparative Example 6 |  |  | (B-1) | 0.8 | (C-2) | 79.2 | (D-2) | 3 |
|  |  |  |  |  | (C-3) | 20 |  |  |

Coating and Preparation of Cured Product

Each of the compositions of Examples and Comparative Examples was coated on a polycarbonate substrate by means of wire-wound bar No. 7 to a wet coating thickness of 16.0 m. Coating was followed by drying at 100° C. for 1 minute. Using a conveyor type metal halide UV exposure system (Panasonic Corp.), the coating in nitrogen atmosphere was exposed to UV in an accumulative exposure dose of 400 mJ/cm$^2$ for curing the composition to form a cured film of 5 m thick.

[Coating State of Composition]

The coating state (coating surface appearance) of each composition was observed with naked eyes. The composition which could not be coated smooth was no longer evaluated. The results are shown in Table 2.

[Evaluation of Water/Oil Repellency]

1) Measurement of Contact Angle with Water

Using a contact angle meter (DropMaster by Kyowa Interface Science Co., Ltd.), a 2-µL droplet of water was dropped onto a cured film and a contact angle with water was measured after 1 second. The measurement is an average of 5 samples. The results are shown in Table 2.

[Measurement of Coefficient of Dynamic Friction]

The coefficient of dynamic friction between the cured film and BEMCOT (Asahi Kasei Corp.) was measured using a surface property tester (Shinto Scientific Co., Ltd.) under the following conditions. The results are shown in Table 2.

Contact area: 10 mm×35 mm

Load: 100 g

[Evaluation of Marker Ink Repellency]

With a marker pen (Hi-Mckee thick by Zebra Co. Ltd.), a straight line was drawn on the surface of a cured film. The degree of repellency or cissing was evaluated by visual observation. The results are shown in Table 2.

[Evaluation of Marker Ink Wipe-Off]

With a marker pen (Hi-Mckee thick by Zebra Co. Ltd.), a straight line was drawn on the surface of a cured film. After 1 minute, the surface was lightly rubbed with tissue paper 3 strokes. The sample in which no ink marks are left is evaluated "wipe-off" and the sample in which ink marks are left is evaluated "non-wipe-off". The results are shown in Table 2.

TABLE 2

|  | Coating surface appearance | Contact angle with water (°) | Contact angle with oleic acid (°) | Coefficient of dynamic friction | Marker ink repellency | Marker ink wipe-off |
|---|---|---|---|---|---|---|
| Example 1 | smooth | 115.1 | 74.1 | 0.08 | repellent | wipe-off |
| Example 2 | smooth | 114.3 | 73.0 | 0.09 | repellent | wipe-off |
| Example 3 | smooth | 116.8 | 75.4 | 0.07 | repellent | wipe-off |
| Example 4 | smooth | 115.5 | 74.7 | 0.08 | repellent | wipe-off |
| Example 5 | smooth | 113.7 | 71.2 | 0.10 | repellent | wipe-off |
| Example 6 | smooth | 115.3 | 74.4 | 0.09 | repellent | wipe-off |

TABLE 2-continued

| | Coating surface appearance | Contact angle with water (°) | Contact angle with oleic acid (°) | Coefficient of dynamic friction | Marker ink repellency | Marker ink wipe-off |
|---|---|---|---|---|---|---|
| Example 7 | smooth | 116.4 | 75.5 | 0.07 | repellent | wipe-off |
| Example 8 | smooth | 115.9 | 75.2 | 0.07 | repellent | wipe-off |
| Example 9 | smooth | 115.2 | 74.2 | 0.08 | repellent | wipe-off |
| Comparative Example 1 | orange peel | — | — | — | — | — |
| Comparative Example 2 | orange peel | — | — | — | — | — |
| Comparative Example 3 | smooth | 113.1 | 72.1 | 0.12 | repellent | wipe-off |
| Comparative Example 4 | smooth | 111.2 | 69.4 | 0.14 | repellent | wipe-off |
| Comparative Example 5 | smooth | 66.7 | 10.2 | 0.68 | not repellent | non-wipe-off |
| Comparative Example 6 | smooth | 113.1 | 72.1 | 0.13 | repellent | wipe-off |

As is evident from the foregoing results, the compositions of Comparative Examples 1 and 2 which contained only components (A) and (C), but not component (B) were ineffective in coating and failed to provide a smooth surface. The compositions of Examples 1 to 9 which contained components (A), (B), and (C) were successful in forming a smooth coating surface. Also, the compositions of Examples 1 to 9 formed surfaces having high liquid repellency and slippage as compared with the compositions of Comparative Examples 3, 4 and 6 which contained only components (B) and (C), but not component (A) and the composition of Comparative Example 5 which contained only component (C), but not components (A) and (B).

The invention claimed is:

1. A curable fluorinated composition comprising as essential components, component (A) which is a fluorinated acrylic compound in the form of a linear polymer having a fluoropolyether backbone, having a trifluoromethyl group at one end of the molecule and at least two (meth)acryloyl groups at the other end of the molecule, and having the general formula (1):

$$Rf^4\text{—}Z^1\text{-}Q^1[X^1]_a \quad (1)$$

wherein $Rf^4$ is a monovalent perfluoropolyether group having a trifluoromethyl group at the opposite end to the end of attachment to $Z^1$, which is represented by $Rf^1\text{—}O\text{—}Rf^2\text{—}CF_2\text{—}$, wherein $Rf^1$ is a $C_{1-10}$ perfluoroalkyl group having a trifluoromethyl group at the opposite end to the end of attachment to the oxygen atom, which may contain oxygen, and $Rf^2$ is a divalent perfluoropolyether group consisting of randomly arranged repeat units of one or more types selected from the following four types:
—$CF_2O$—,
—$CF_2CF_2O$—,
—$CF_2CF_2CF_2O$—, and
—$CF_2CF_2CF_2CF_2O$—, $Z^1$ is a linking group in the form of a $C_{1-20}$ divalent hydrocarbon group which may contain at least one heteroatom selected from oxygen, nitrogen, and silicon, which may contain a cyclic structure therein, and in which some carbon-bonded hydrogen may be substituted by fluorine, $Q^1$ is a (a+1)-valent linking group containing at least (a+1) number of silicon atoms, which may take a cyclic structure, "a" is an integer of 2 to 5, and $X^1$ is independently a monovalent organic group having a (meth)acryloyl group which may contain at least one heteroatom selected from oxygen, nitrogen, and silicon, component (B) which is a compound in the form of a linear polymer having a fluoropolyether backbone, having at least two (meth)acryloyl groups at each end of the molecule, and having on the average 4 to 10 (meth)acryloyl groups per molecule, and component (C) which is a non-fluorinated acrylic compound free of fluoropolyether structure and having on the average at least two (meth)acryloyl groups per molecule, wherein the total amount of components (A) and (B) blended is 0.05 to 50 parts by weight per 100 parts by weight of component (C), and the amount of component (A) blended is 1 to 100 parts by weight per 100 parts by weight of component (B).

2. The curable fluorinated composition of claim 1, further comprising (D) a photopolymerization initiator.

3. The curable fluorinated composition of claim 1, wherein component (B) is a fluorinated acrylic compound having the general formula (2):

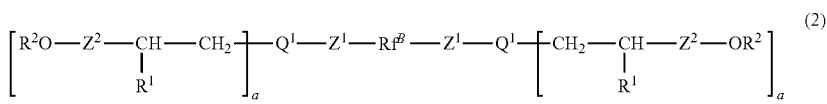

wherein $Rf^B$ is a divalent perfluoropolyether group, $Z^1$ is independently a linking group in the form of a $C_{1-20}$ divalent hydrocarbon group which may contain at least one heteroatom selected from oxygen, nitrogen, and silicon, which may contain a cyclic structure therein, and in which some carbon-bonded hydrogen may be substituted by fluorine, $Q^1$ is independently a (a+1)-valent linking group containing at least (a+1) number of silicon atoms, which may take a cyclic structure, "a" is an integer of 2 to 5, $Z^2$ is each independently a $C_{1-100}$ divalent hydrocarbon group which may contain oxygen and/or nitrogen, and which may contain a cyclic structure therein, $R^1$ is independently hydrogen or a $C_{1-8}$ monovalent hydrocarbon group, $R^2$ is independently hydrogen or a monovalent organic group having a (meth)acryloyl group, which may contain oxygen and/or nitrogen, with the proviso that there are contained at least two monovalent organic groups $R^2$ at each end of the molecule and on the average 4 to 10 monovalent organic groups $R^2$ per molecule.

4. The curable fluorinated composition of claim 1, wherein in formula (1) representative of component (A), $X^1$ is selected from the following:

—CH₂CH₂CH₂OC(=O)NHCH₂CH₂OC(=O)CH=CH₂
—CH₂CH₂CH₂OCH₂CH₂OC(=O)NHCH₂CH₂OC(=O)CH=CH₂
—CH₂CH₂CH₂OC(=O)NHCH₂CH₂OC(=O)C(CH₃)=CH₂
—CH₂CH₂CH₂OCH₂CH₂OC(=O)NHCH₂CH₂OC(=O)C(CH₃)=CH₂
—CH₂CH₂CH₂OC(=O)NHC(CH₃)[CH₂OC(=O)CH=CH₂]₂
—CH₂CH₂CH₂OCH₂CH₂OC(=O)NHC(CH₃)[CH₂OC(=O)CH=CH₂]₂
—CH₂CH₂CH₂OC(=O)CH=CH₂
—CH₂CH₂CH₂OCH₂CH₂OC(=O)CH=CH₂
—CH₂CH₂CH₂OC(=O)C(CH₃)—CH₂
—CH₂CH₂CH₂OCH₂CH₂OC(=O)C(CH₃)—CH₂
—CH₂CH₂Si[OSi(CH₃)₂CH₂OC(=O)CH=CH₂]₃
—CH₂CH₂Si[Osi(CH₃)₂CH₂OC(=O)C(CH₃)—CH₂]₃

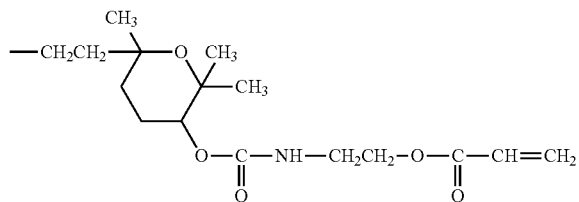

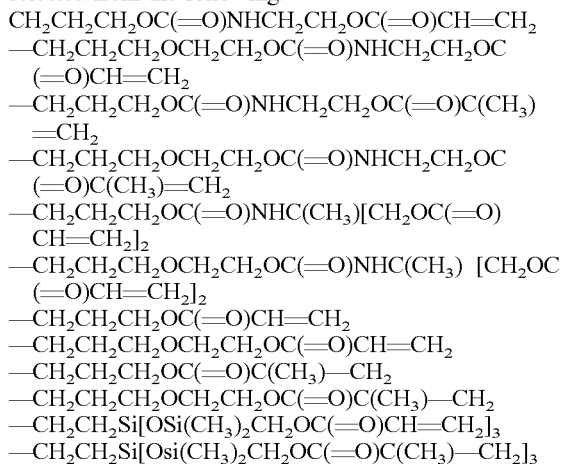

5. The curable fluorinated composition of claim 1, wherein in formula (1) representative of component (A), $Q^1$ is selected from the following:

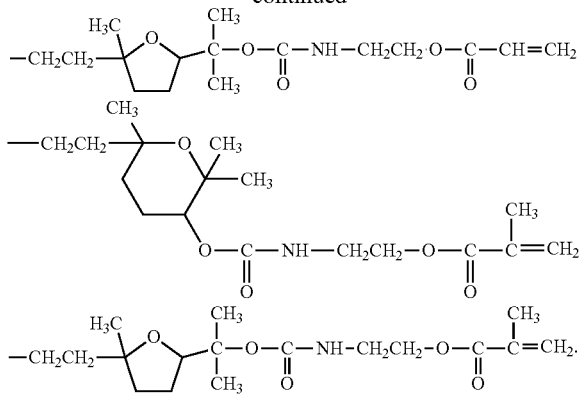

wherein "a" is an integer of 2 to 5, and b is an integer of 1 to 5.

6. The curable fluorinated composition of claim 1, wherein the fluorinated acrylic compound having formula (1) representative of component (A) is selected from compounds having the following formulae:

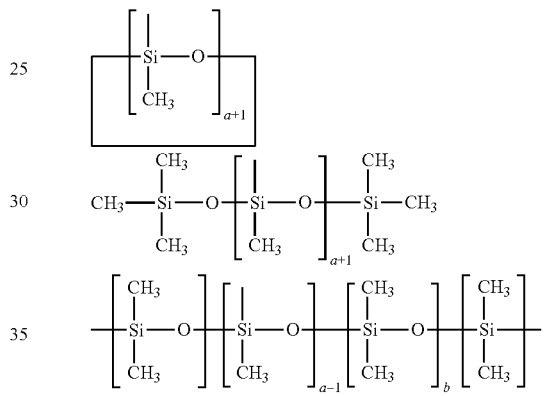

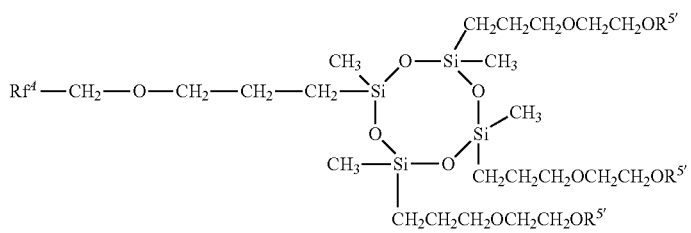

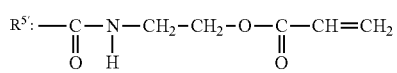

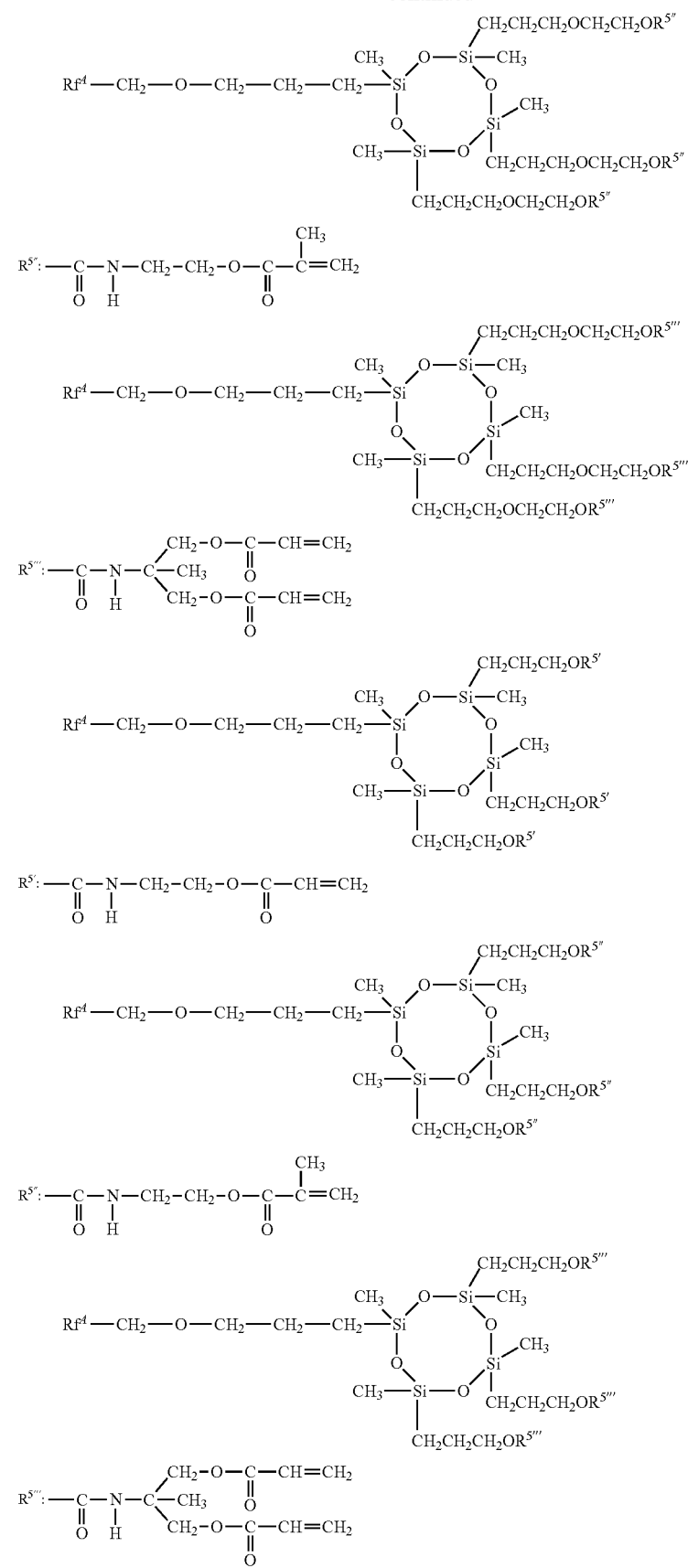

-continued
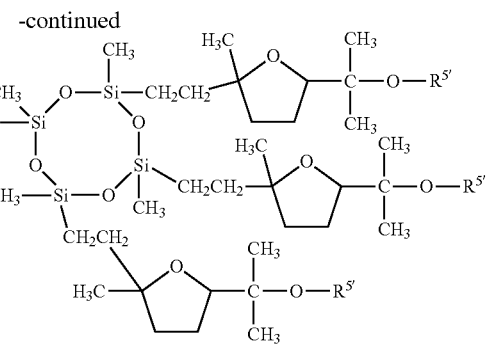
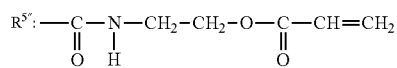
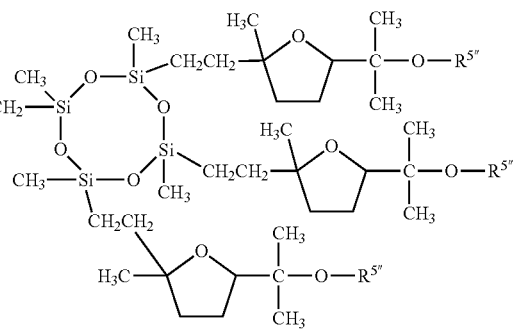
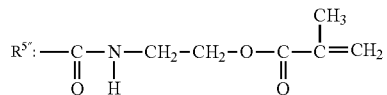
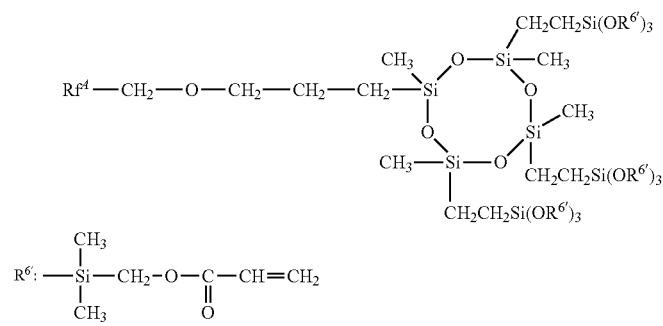
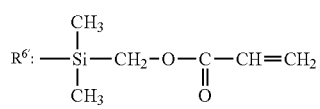
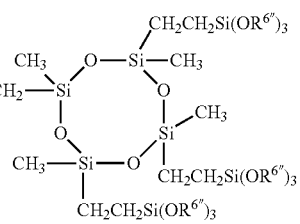
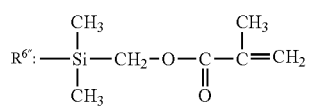
wherein Rf⁴ is as defined above.

7. The curable fluorinated composition of claim 3 wherein $Z^1$ in formula (2) representative of component (B) is selected from the following —$CH_2CH_2$—
—$CH_2CH_2CH_2$—
—$CH_2CH_2CH_2CH_2$—
—$CH_2OCH_2CH_2$—
—$CH_2OCH_2CH_2CH_2$—.

8. The curable fluorinated composition of claim 3, wherein $Q^1$ in formula (2) representative of component (B) is a group having the following formula:

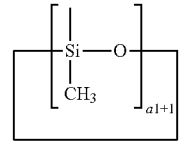

wherein a1 is 2 or 3.

9. The curable fluorinated composition of claim 3, wherein the fluorinated acrylic compound having formula (2) representative of component (B) is a fluorinated acrylic compound having the general formula (3) or (4):

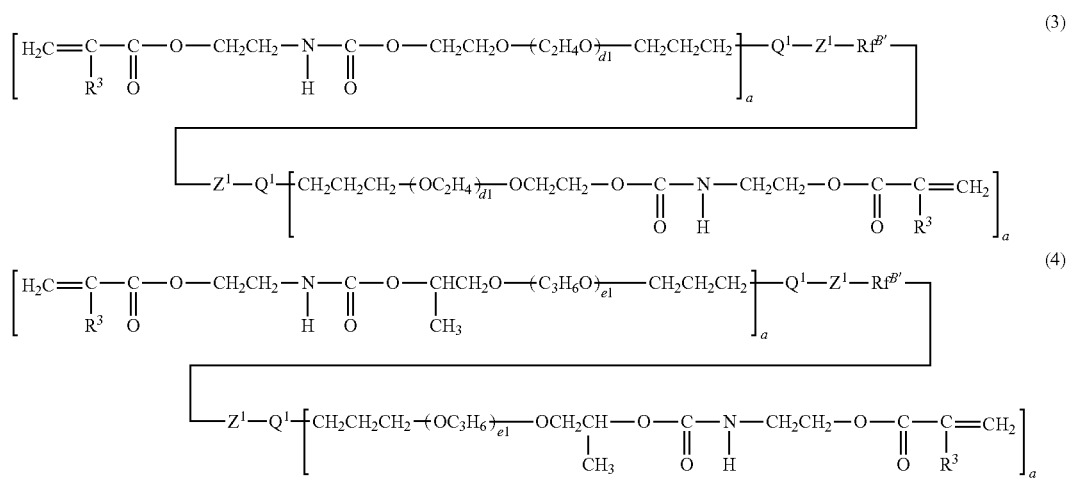

wherein $Z^1$, $Q^1$, and "a" are as defined above, $Rf^{B'}$ is —$CF_2O(CF_2O)_m(CF_2CF_2O)_nCF_2$—, m is an integer of 1 to 200, n is an integer of 1 to 170, m+n is an integer of 6 to 201, the arrangement of —($CF_2O$)— and —($CF_2CF_2O$)— is random, $R^3$ is hydrogen or methyl, d1 and e1 each are an integer of 0 to 10.

10. The curable fluorinated composition of claim 1, wherein the non-fluorinated acrylic compound as component (C) is a polyfunctional acrylic compound containing at least two (meth)acryloyl groups per molecule, but free of a urethane bond, a polyfunctional urethane (meth)acrylate having at least three (meth)acryloyl groups per molecule which is obtained by reacting said polyfunctional acrylic compound with an aliphatic polyisocyanate and a hydroxy-containing acrylic compound, or a mixture of at least two acrylic compounds including said polyfunctional acrylic compound and said polyfunctional urethane (meth)acrylate.

11. An article having a cured film of the curable fluorinated composition of claim 1 on its surface.

12. The curable fluorinated composition of claim 1, wherein $Rf^2$ is a divalent perfluoropolyether group represented by the following formula:

—$(CF_2O)_m(CF_2CF_2O)_n$— wherein m is an integer of 1 to 200, n is an integer of 1 to 170, and m+n is an integer of 6 to 201.

* * * * *